United States Patent
Vajjhala et al.

(10) Patent No.: US 7,150,021 B1
(45) Date of Patent: Dec. 12, 2006

(54) METHOD AND SYSTEM TO ALLOCATE RESOURCES WITHIN AN INTERCONNECT DEVICE ACCORDING TO A RESOURCE ALLOCATION TABLE

(75) Inventors: Varaprasad Vajjhala, San Jose, CA (US); Richard L. Schober, Cupertino, CA (US)

(73) Assignee: Palau Acquisition Corporation (Delaware), Santa Clara, CA (US)

( * ) Notice: Subject to any disclaimer, the term of this patent is extended or adjusted under 35 U.S.C. 154(b) by 760 days.

(21) Appl. No.: 09/977,511

(22) Filed: Oct. 12, 2001

(51) Int. Cl.
*G06F 9/46* (2006.01)

(52) U.S. Cl. ....................... 718/104; 718/103
(58) Field of Classification Search ........ 370/229–395; 709/200–253; 718/103–104
See application file for complete search history.

(56) References Cited

U.S. PATENT DOCUMENTS

| | | | |
|---|---|---|---|
| 6,614,764 B1 * | 9/2003 | Rodeheffer et al. | 370/254 |
| 6,631,419 B1 * | 10/2003 | Greene | 709/238 |
| 6,661,788 B1 * | 12/2003 | Angle et al. | 370/390 |

OTHER PUBLICATIONS

"InfiniBand Switch Cip Runs at 10 Gbps On Eight Ports", Nicholas Cravotta, Nov. 8, 2001, EDN, 1 page.
"Assemble Fast Switch Fabrics With 32-Port InfiniBand Node p. 60", Electronic Design, Oct. 15, 2001, 4 pages.
"RedSwitch, Inc. Announces Industry's Highest Performance and Highest Integration InfiniBand Switch Chip", RedSwitch Press Release, Oct. 16, 2001, 2 pages.
"RedSwitch Gearing Up To Launch New Chip", Steve Tanner, Silicon Valley Business Ink, Oct. 26, 2001, 3 pages.
"Mellanox Integrates Serdes Into InfiniBand Switch", Jerry Ascierto, EE Times, Oct. 23, 2001, 3 pages.
"Switch Chip Expands InfiniBand Integration", EEM File 3130, Tony Chance, 2 pages.
"RedSwitch Announces 16 Gbyte/s Throughout Switch Product for RapidIO Architecture", RedSwitch Press Release, Milpitas, Calif., May 15, 2001, Tony Chance,May 15, 2001, 2 pages.
"RedSwitch and Agilent Technologies Unveil 160-GB/s Throughout Switch Product for InfiniBand Architecture", RedSwitch Press Release, Intel Developer Forum Conference, San Jose, Calif., Feb. 27, 2001, Mark Alden-Agilent, Tony Chance-RedSwitch, 2 pages.

* cited by examiner

*Primary Examiner*—Meng-Ai An
*Assistant Examiner*—Kenneth Tang
(74) *Attorney, Agent, or Firm*—Borden Ladner Gervais LLP

(57) ABSTRACT

A method and apparatus to allocate resource capacity within an interconnect device in accordance with a resource allocation table (e.g., a priority list) facilitate identification of a resource consumer to be allocated a portion of the resource capacity in an efficient manner. The resource allocation table stores a number of allocation entries indicating an allocation of the resource capacity to a number of resource consumers (e.g., virtual lanes). A ranking vector corresponding to a first allocation entry within the allocation table is retrieved. A pending request vector, indicating for which of the plurality of resource consumers a resource request is pending, is generated. A selected resource consumer to consume at least a portion of the resource capacity is selected, the selection being performed utilizing the ranking vector and the pending request vector. The ranking vector is derived from the resource allocation table and comprises a list of resource consumers of the plurality of resource consumers, the list being ordered in accordance to an order of appearance of a first allocation entry for a respective resource consumer within the resource allocation table.

31 Claims, 33 Drawing Sheets

ARBITRATION TABLE

| Index | VL | Weight Value |
|---|---|---|
| 0 | 0 | 1 |
| 1 | 1 | 1 |
| 2 | 0 | 1 |
| 3 | 2 | 0 |
| 4 | 0 | 1 |
| 5 | 3 | 1 |
| 6 | 0 | 1 |
| 7 | 2 | 1 |
| 8 | 1 | 1 |
| 9 | 4 | 1 |
| 10 | 0 | 0 |
| 11 | F | 1 |
| 12 | F | 1 |
| 13 | F | 1 |
| 14 | F | 1 |
| 15 | F | 0 |

INDEX POINTER → (at index 0)

REQUEST PENDING ← (at index 9)

Fig. 2B
(PRIOR ART)

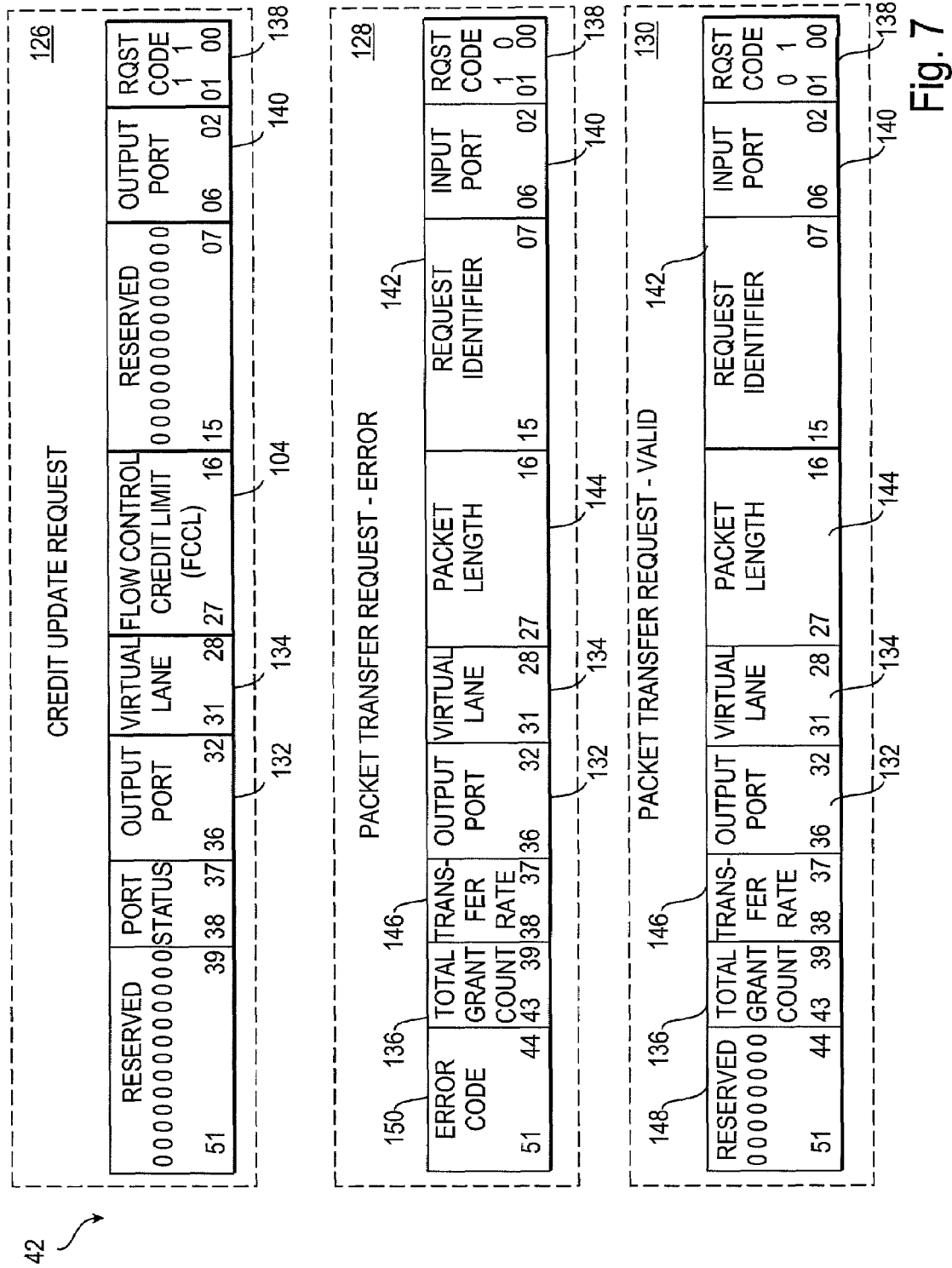

GRANT 180

| TOTAL BLOCKS SENT | TOTAL GRANT COUNT | TRANS-FER RATE | OUTPUT PORT | VIRTUAL LANE | PACKET LENGTH | REQUEST IDENTIFIER | INPUT PORT | GRANT CODE |
|---|---|---|---|---|---|---|---|---|
| 184 | 136 | 146 | 132 | 134 | 144 | 142 | | 182 |
| 56 55 | 44 43 | 39 38 37 36 | 32 31 | 28 27 | 17 16 | 07 06 | 02 01 | 00 |

| ERROR CODE |
|---|
| 186 |
| 63 56 |

TRANSFER RATE

| VALUE | MEANING |
|---|---|
| 0 0 | 1 CYCLE PER WORD |
| 0 1 | 4 CYCLES PER WORD |
| 1 0 | 3 CYCLES PER WORD (RESERVED) |
| 1 1 | 12 CYCLES PER WORD (RESERVED) |

GRANT CODE

| VALUE | MEANING |
|---|---|
| 0 0 | NULL |
| 0 1 | VALID |
| 1 0 | ERROR |
| 1 1 | RESERVED |

ERROR CODE

| VALUE | MEANING |
|---|---|
| 0 0 0 0 0 0 0 0 | NO ERROR |
| 0X 0 0 0 0 0 1 | UNICAST DLID OUT-OF-RANGE |
| 0X 0 0 0 0 1 0 | UNICAST FORWARDING TALE ENTRY NOT VALID OR DEFAULT MULTICAST PORT REGISTERS NOT VALID |
| 0X 0 0 0 0 1 1 | OUTPUT PORT NOT VALID FOR MGMT PORT DIRECTED-ROUTE PACKET |
| 0X 1 X X X X 1 | (OUTPUT PORT = INPUT PORT) & (PORT = 0) |
| 0X 1 X X X 1 X | SL-TO-VL MAP TABLE ENTRY NOT VALID |
| 0X 1 X X 1 X X | PACKET LARGER THAN NEIGHBOR MTU |
| 0X 1 1 0 X X X | RAW PACKET NOT VALID FOR OUTPUT PORT |
| 0X 1 1 1 X X X | P-KEY NOT VALID FOR OUTPUT PORT |
| 01 X X X X X X | P-KEY NOT VALID FOR INPUT PORT |
| 1 1 1 1 1 1 0 1 | OUTPUT PORT OFFLINE |
| 1 1 1 1 1 1 1 0 | HEAD-OF-QUEUE LIFETIME TIMEOUT |
| 1 1 1 1 1 1 1 1 | SWITCH LIFETIME TIMEOUT |

Fig. 8

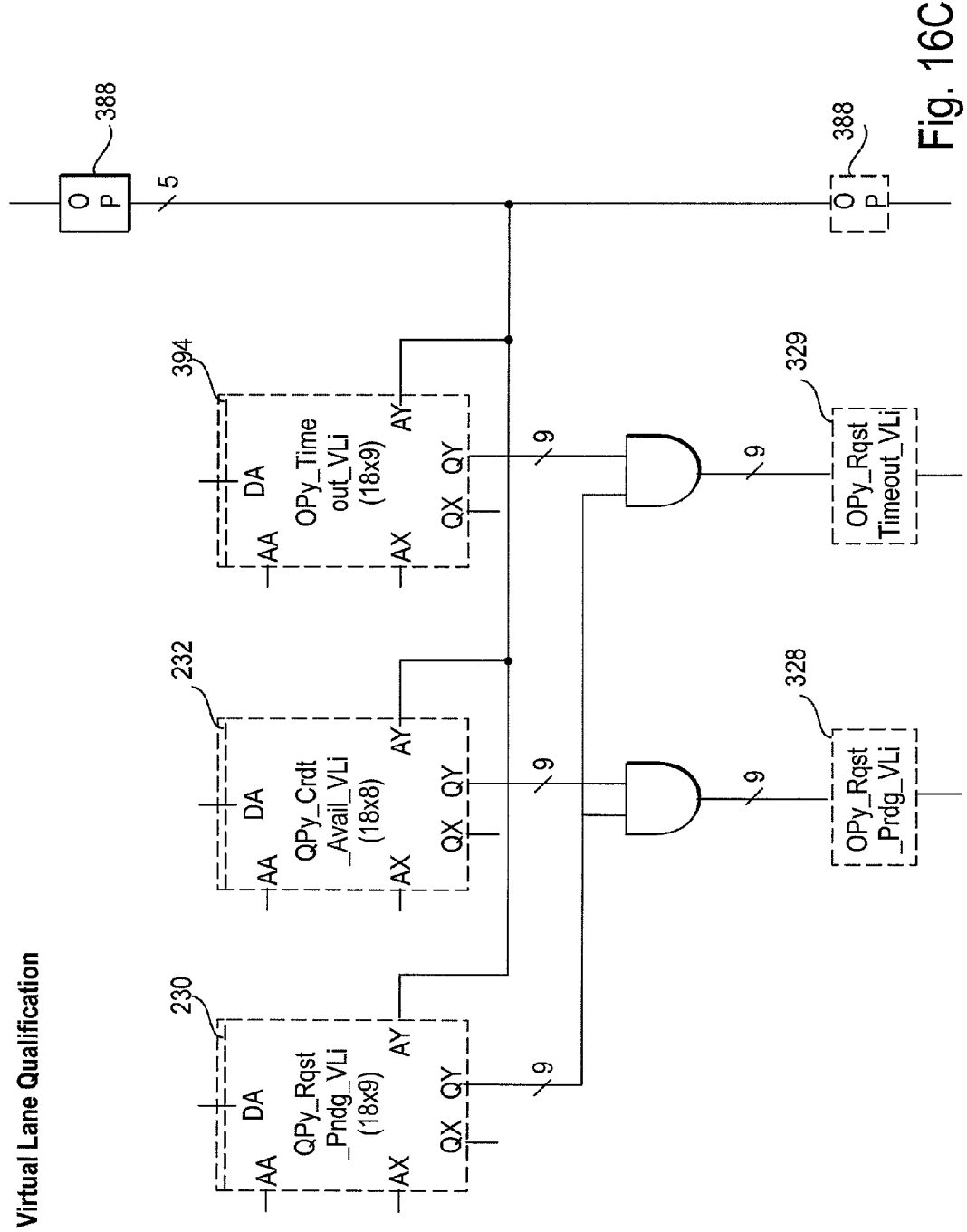

Virtual Lane Selection 1
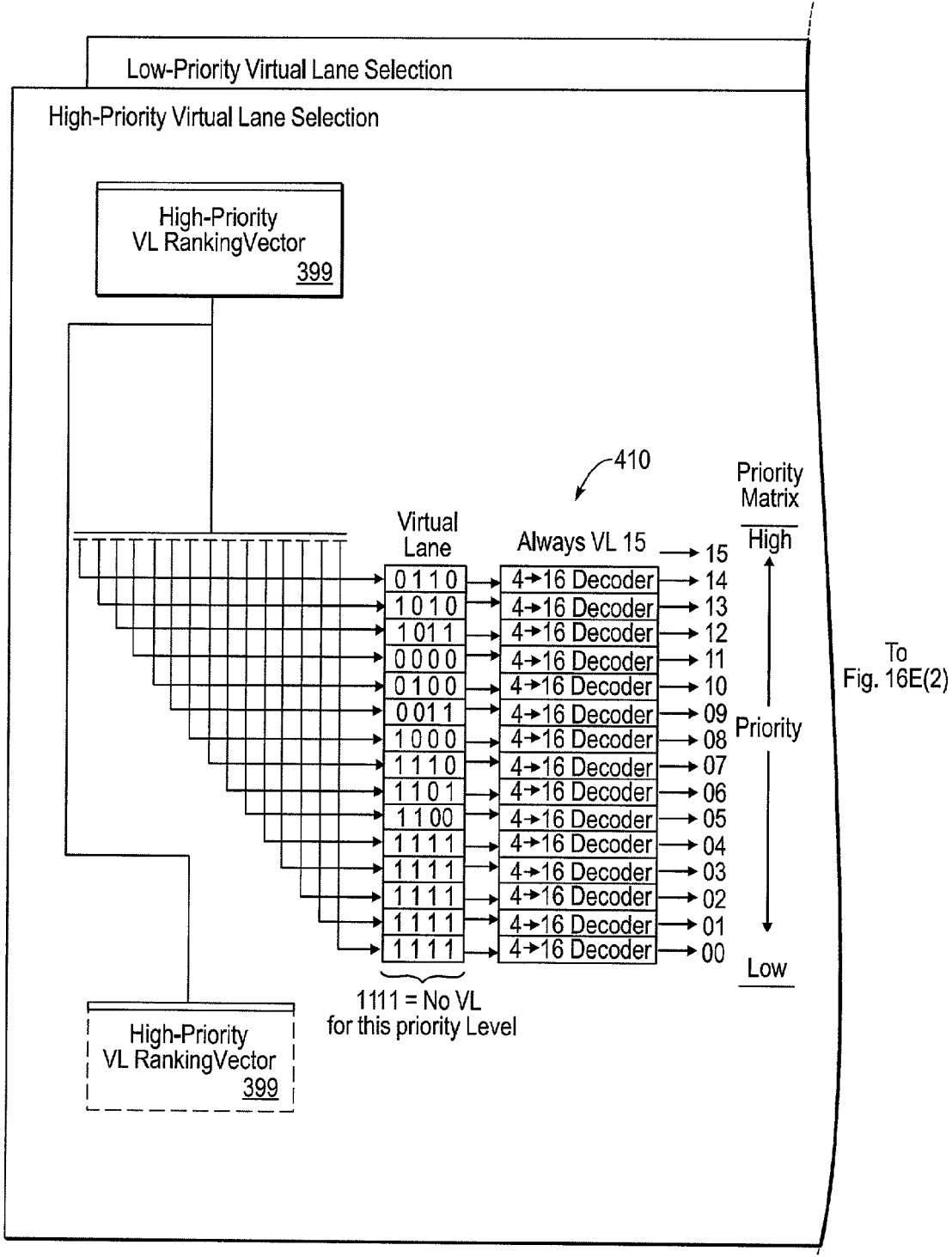
Fig. 16E(1)

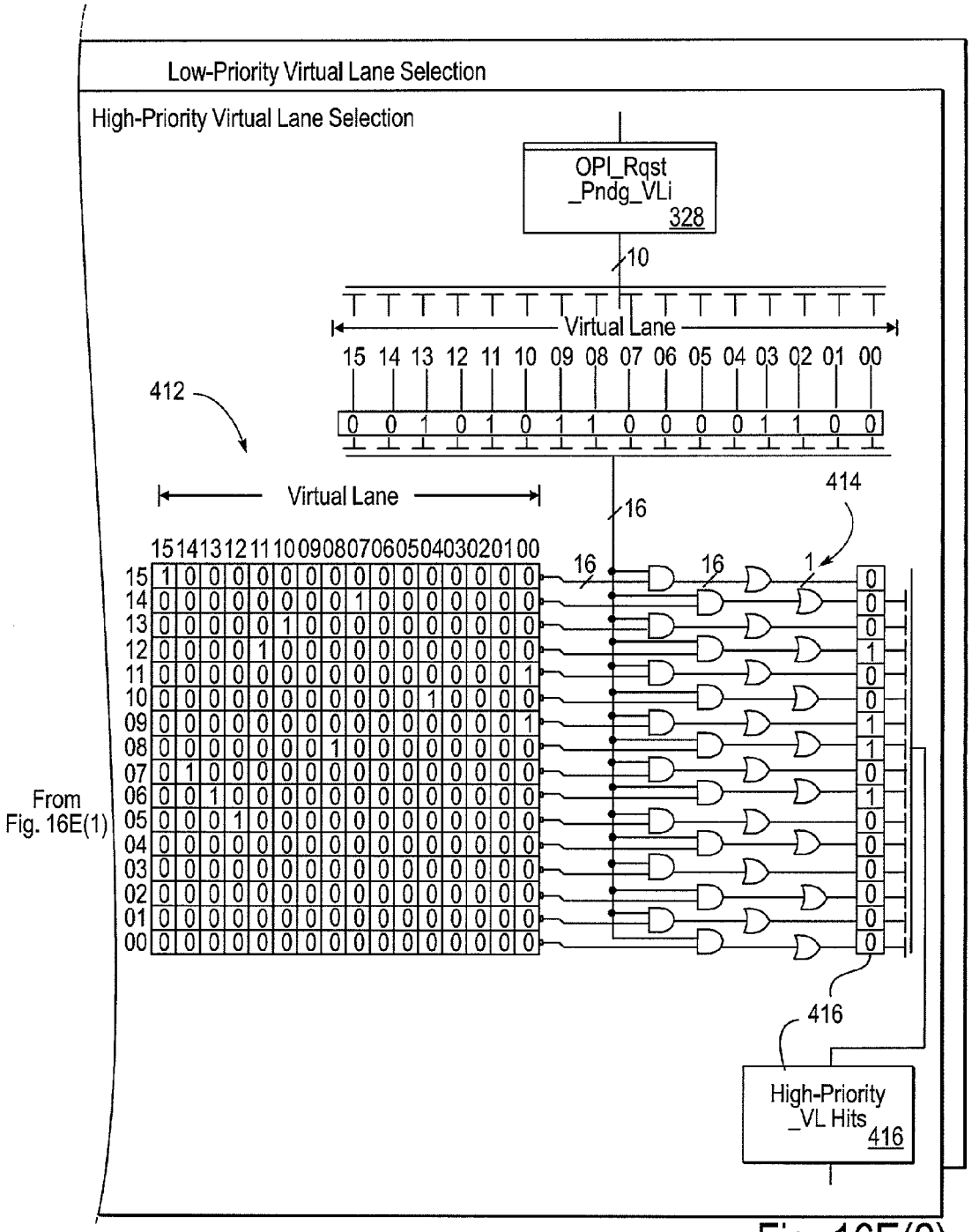
Fig. 16E(2)

METHOD AND SYSTEM TO ALLOCATE RESOURCES WITHIN AN INTERCONNECT DEVICE ACCORDING TO A RESOURCE ALLOCATION TABLE

FIELD OF THE INVENTION

The present invention relates generally to the field of data communications and, more specifically, to the allocation of resources (e.g., bandwidth) within an interconnect device as specified by a resource allocation table.

BACKGROUND OF THE INVENTION

Existing networking and interconnect technologies have failed to keep pace with the development of computer systems, resulting in increased burdens being imposed upon data servers, application processing and enterprise computing. This problem has been exasperated by the popular success of the Internet. A number of computing technologies implemented to meet computing demands (e.g., clustering, fail-safe and 24×7 availability) require increased capacity to move data between processing nodes (e.g., servers), as well as within a processing node between, for example, a Central Processing Unit (CPU) and Input/Output (I/O) devices.

With a view to meeting the above described challenges, a new interconnect technology, called the InfiniBand™, has been proposed for interconnecting processing nodes and I/O nodes to form a System Area Network (SAN). This architecture has been designed to be independent of a host Operating System (OS) and processor platform. The InfiniBand™ Architecture (IBA) is centered around a point-to-point, switched IP fabric whereby end node devices (e.g., inexpensive I/O devices such as a single chip SCSI or Ethernet adapter, or a complex computer system) may be interconnected utilizing a cascade of switch devices. The InfiniBand™ Architecture is defined in the InfiniBand™ Architecture Specification Volume 1, Release 1.0, released Oct. 24, 2000 by the InfiniBand Trade Association. The IBA supports a range of applications ranging from back plane interconnects of a single host, to complex system area networks, as illustrated in FIG. 1 (prior art). In a single host environment, each IBA switched fabric may serve as a private I/O interconnect for the host providing connectivity between a CPU and a number of I/O modules. When deployed to support a complex system area network, multiple IBA switch fabrics may be utilized to interconnect numerous hosts and various I/O units.

Within a switch fabric supporting a System Area Network, such as that shown in FIG. 1, there may be a number of devices having multiple input and output ports through which data (e.g., packets) is directed from a source to a destination. Such devices include, for example, switches, routers, repeaters and adapters (exemplary interconnect devices). Where data is processed through a device, it will be appreciated that multiple data transmission requests may compete for resources of the device. For example, where a switching device has multiple input ports and output ports coupled by a crossbar, packets received at multiple input ports of the switching device, and requiring direction to specific outputs ports of the switching device, compete for at least input, output and crossbar resources.

In order to facilitate multiple demands on device resources, an arbitration scheme is typically employed to arbitrate between competing requests for device resources. Such arbitration schemes are typically either (1) distributed arbitration schemes, whereby the arbitration process is distributed among multiple nodes, associated with respective resources, through the device or (2) centralized arbitration schemes whereby arbitration requests for all resources is handled at a central arbiter. An arbitration scheme may further employ one of a number of arbitration policies, including a round robin policy, a first-come-first-serve policy, a shortest message first policy or a priority based policy, to name but a few.

The physical properties of the IBA interconnect technology have been designed to support both module-to-module (board) interconnects (e.g., computer systems that support I/O module add in slots) and chassis-to-chassis interconnects, as to provide to interconnect computer systems, external storage systems, external LAN/WAN access devices. For example, an IBA switch may be employed as interconnect technology within the chassis of a computer system to facilitate communications between devices that constitute the computer system. Similarly, an IBA switched fabric may be employed within a switch, or router, to facilitate network communications between network systems (e.g., processor nodes, storage subsystems, etc.). To this end, FIG. 1 illustrates an exemplary System Area Network (SAN), as provided in the InfiniBand Architecture Specification, showing the interconnection of processor nodes and I/O nodes utilizing the IBA switched fabric.

The IBA Specification discusses the implementation of multiple data virtual lanes (VLs), an arbitration scheme to be employed when arbitration between packets on the multiple data virtual lanes. The proposed arbitration scheme is a two-level scheme, which utilizes preemptive scheduling layered on top of a weighted fair scheme. The scheme provides for a method to ensure the progress of requests on low-priority virtual lanes. The weighing, prioritization and minimum forward progress bandwidth are each programmable.

FIG. 2A illustrates a virtual lane arbitration table 11 that may be utilized according to the IBA Specification to control virtual lane arbitration. The arbitration table 11 consists of three components, namely a high-priority list 12, a low-priority list 13, and a limit of high-priority component 14. The high-priority list 12 has a minimum length of 1 entry, and a maximum length of 64 entries. The low-priority list 13 has a minimum length equal to the number of the data virtual lanes supported by an interconnect device, and a maximum length of 64 entries.

The high-priority list 12 and the low priority list 13 each contain a virtual lane number 15 (e.g., a value from 0–14 for a used entry, or a value of 15 to indicate an unused entry) and a weight value 16 (e.g., a value 0–255) indicating the number of 64 byte units that may be transmitted via the relevant virtual lane when selected during an arbitration process. A weight value 16 of zero indicates that the relevant entry within the arbitration table 11 should be skipped.

The limit of high-priority component 14 indicates the number of high-priority packets that can be transmitted without an opportunity to send a low-priority packet. Specifically, the number of bytes that can be sent is a "limit of high-priority" value times 4 K bytes, with the counting done in the same manner described above for weight values 16. In other words, the calculation is done to 64 byte increments, and a high priority packet can be sent if a current byte count has not exceeded the limit of high-priority value. A limit of high-priority value of 255 indicates that the byte limit is unbounded, in which case there is no guarantee of forward progress for low priority packets. A limit of high-priority value of zero indicates that only a single packet may be sent from the high-priority list 12 before an opportunity is given to the low-priority list 13.

FIG. 2B illustrates a populated arbitration table 11 for a port supporting a number of virtual lanes, virtual lanes 0–4 having been allocated bandwidth as indicated by respective weight values 16. It will be noted that multiple entries for a single virtual lane (e.g., virtual lane 0) may appear within the arbitration table 11. In this way, the virtual lane 0 is allocated bandwidth at periodic intervals, to provide continuity of service to this virtual lane 0. For example, virtual lane 0 may be dedicated to the transport of video data, in which case it may be desirable to allocate bandwidth on a periodic basis to this virtual lane. Alternatively, the arbitration table 11 could be programmed to contain only a single entry for the virtual lane 0, but the weighting value 16 attributed thereto could be increased (e.g., to value of 4). This would result in the same effective bandwidth allocation to virtual lane 0, but would be better suited to an application where burst service (as opposed to continuous stream service) was required.

FIG. 2B also illustrates that the arbitration table 11 is referenced by an index pointer, which points to a currently selected virtual lane. Upon notification of a pending request, an arbitration mechanism, seeking to identify the next virtual lane to be serviced, performs a walk through the arbitration table 11 in a direction indicated by the arrow 17 to identify a next virtual lane for which a request is pending and that has sufficient credits in order to service a request. Consider the situation illustrated in FIG. 2B, where the walk through the table commences at entry 0, and a pending request requires service on virtual lane 4. The walk through the arbitration table 11 may require one clock cycle per entry. The walk through the example arbitration table 11 to entry 9 could take up to 9 clock cycles. As stated above, the arbitration table 11 may have up to 64 entries. It will be appreciated that in situations where the index pointer is far removed from an entry for a virtual lane for which a request is pending, a walk through the arbitration table 11 may consume a number of clock cycles before the relevant entry is encountered.

SUMMARY OF THE INVENTION

According to the present invention, there is provided a method and system to allocate resource capacity within an interconnect device in accordance with a resource allocation table. The resource allocation table includes a plurality of allocation entries indicating an allocation of the resource capacity to a plurality of the resource consumers. A ranking vector corresponding to a first allocation entry within the allocation table is received. A pending request vector, indicating for which of the plurality of resource consumers a resource request is pending, is generated. A selected resource consumer is selected to consume at least a portion of the resource capacity, the selection being performed utilizing the ranking vector and the pending request vector. The ranking vector is derived from the resource allocation table and comprises a list of resource consumers of the plurality of resource consumers, the list being ordered in accordance to an order of appearance of a first allocation entry for a respective resource consumer within the resource allocation table.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 2B illustrates a populated arbitration table for a port supporting a number of virtual lanes, virtual lanes 0–4 having been dedicated bandwidth as indicated by respective weight values.

FIG. 7 provides representations of exemplary modified resource requests that may be outputted from a request preprocessor to a request allocator of the arbiter illustrated in FIG. 6.

FIG. 8 illustrates an exemplary grant that may be issued responsive to any one of the requests discussed in the present application.

FIG. 16C is a pipeline diagram illustrating an exemplary manner in which a qualification operation performed.

FIG. 16E is a pipeline diagram illustrating exemplary high-priority virtual lane selection operations.

DETAILED DESCRIPTION

A method and system to allocate resources within an interconnect device according to a resource allocation table are described. In the following description, for purposes of explanation, numerous specific details are set forth in order to provide a thorough understanding of the present invention. It will be evident, however, to one skilled in the art that the present invention may be practiced without these specific details.

For the purposes of the present invention, the term "interconnect device" shall be taken to include switches, routers, repeaters, adapters, or any other device that provides interconnect functionality between nodes. Such interconnect functionality may be, for example, module-to-module or chassis-to-chassis interconnect functionality. While an exemplary embodiment of the present invention is described below as being implemented within a switch deployed within an InfiniBand architectured system, the teachings of the present invention may be applied to any interconnect device within any interconnect architecture.

Figure 1:
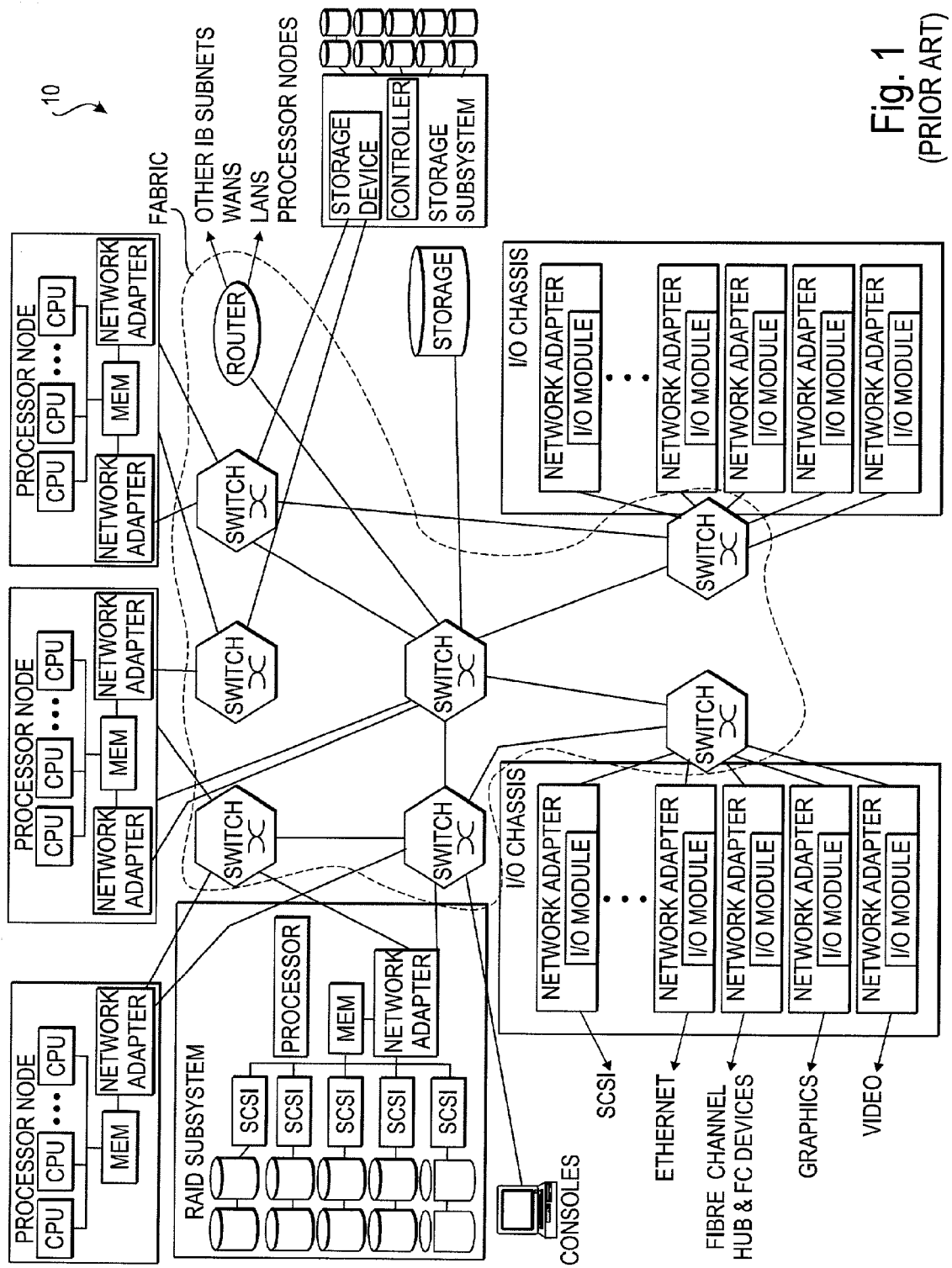
FIG. 1 is a diagrammatic representation of a System Area Network, according to the prior art, as supported by a switch fabric.
Figure 2A:
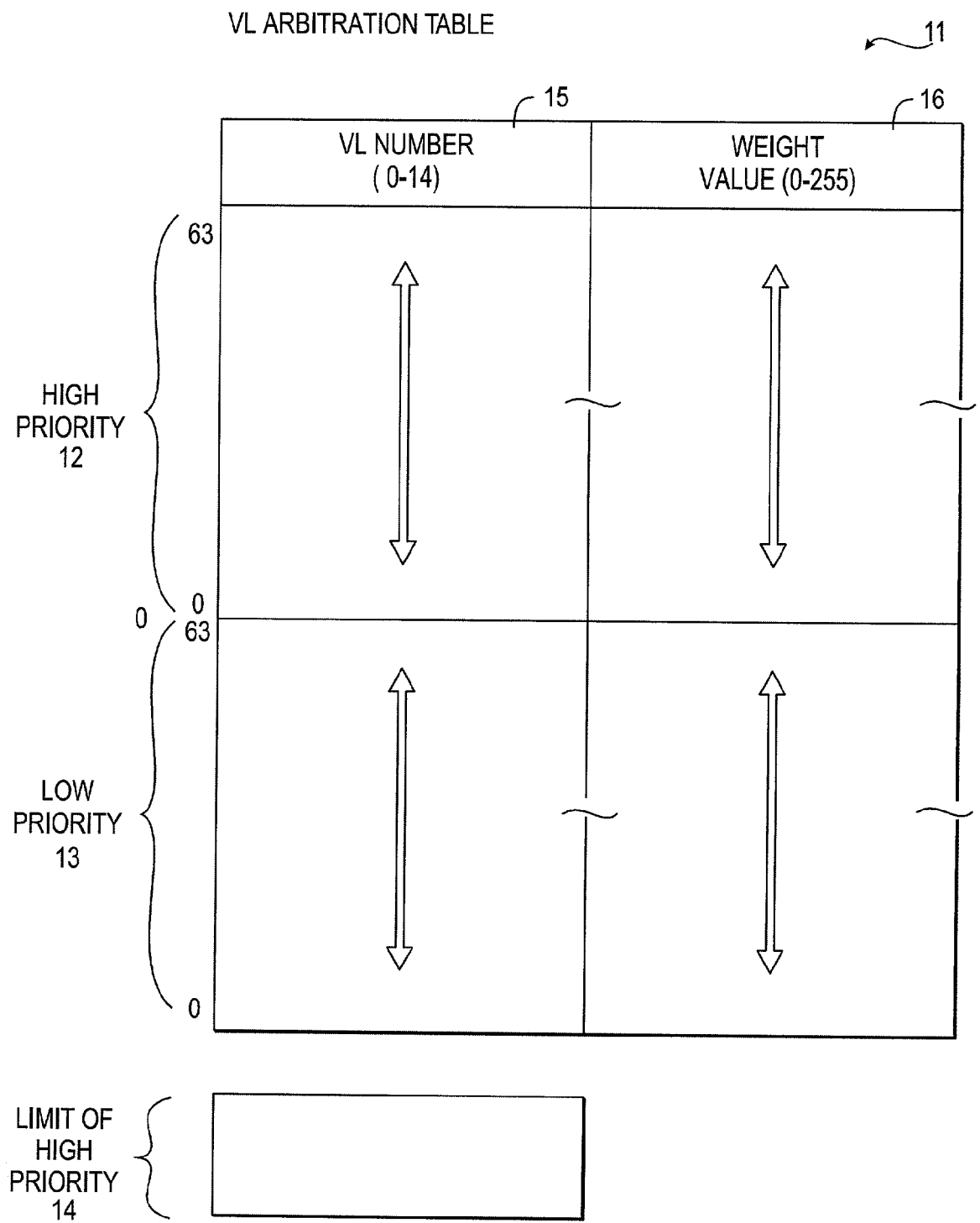
FIG. 2A illustrates a virtual lane arbitration table that may be utilized according to the IBA Specification (prior art) to control virtual lane arbitration.
Figure 3A:
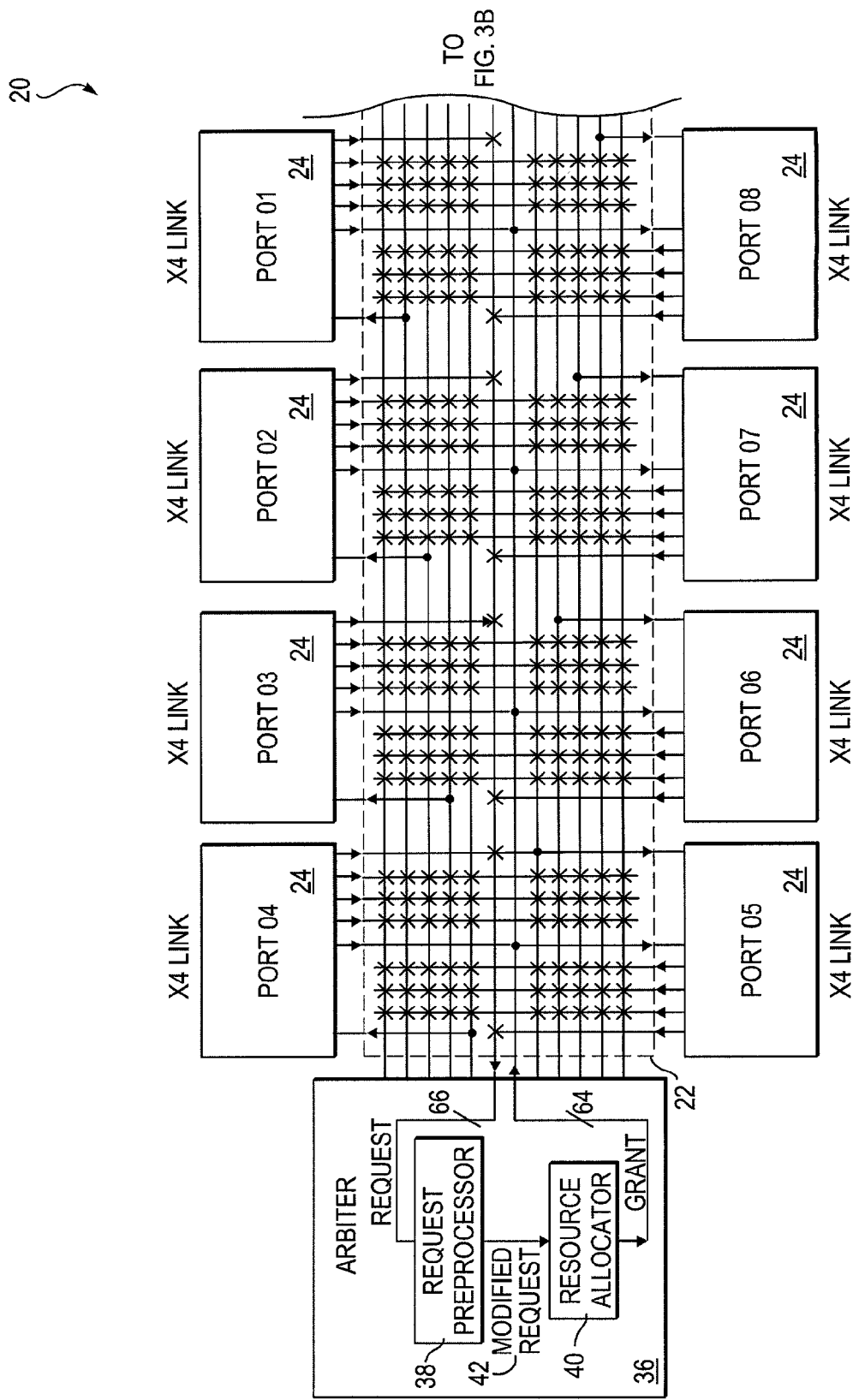
FIGS. 3A and 3B provide a diagrammatic representation of a datapath, according to an exemplary embodiment of the present invention, implemented within an interconnect device (e.g., a switch).
Figure 3B:
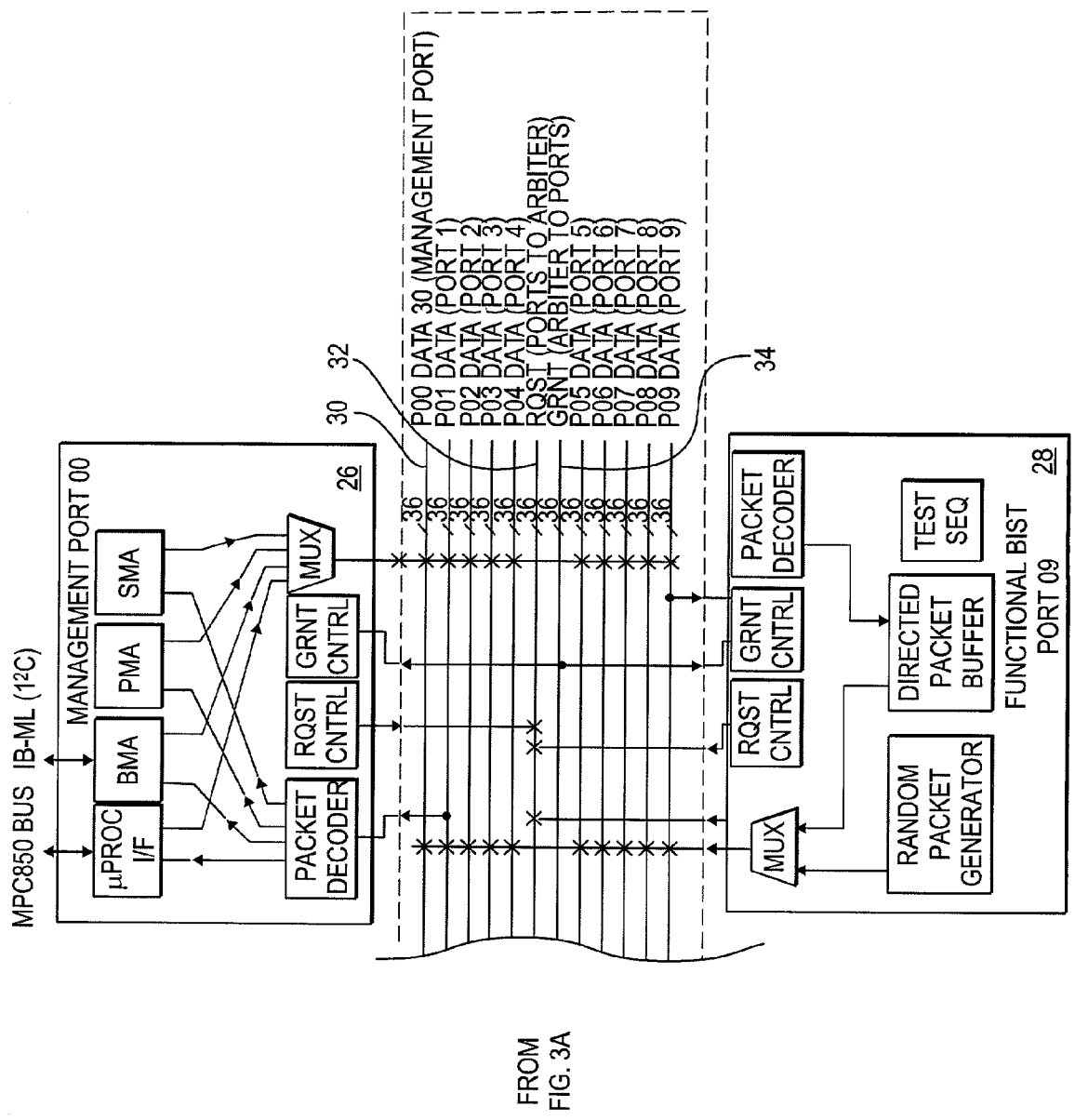

FIGS. 3A and 3B provide a diagrammatic representation of a datapath 20, according to an exemplary embodiment of the present invention, implemented within an interconnect device (e.g., a switch). The datapath 20 is shown to include a crossbar 22 that includes ten 36-bit data buses 30, a 66-bit request bus 32 and a 64-bit grant bus 34. Coupled to the crossbar 22 are eight communications ports 24 that issue resource requests to an arbiter 36 via the request bus 32, and that receive resource grants from the arbiter 36 via the grant bus 34.

The arbiter 36 includes a request preprocessor 38 to receive resource requests from the request bus 32 and to generate a modified resource request 42 to a resource allocator 40. The resource allocator 40 then issues a resource grant on the grant bus 34.

In addition to the eight communications ports, a management port 26 and a functional Built-In-Self-Test (BIST) port 28 are also coupled to the crossbar 22. The management port 26 includes a Sub-Network Management Agent (SMA) that is responsible for network configuration, a Performance Management Agent (PMA) that maintains error and performance counters, a Baseboard Management Agent (BMA) that monitors environmental controls and status, and a microprocessor interface.

The functional BIST port 28 supports stand-alone, at-speed testing of an interconnect device embodying the datapath 20. The functional BIST port 28 includes a random packet generator, a directed packet buffer and a return packet checker.

Figure 4:
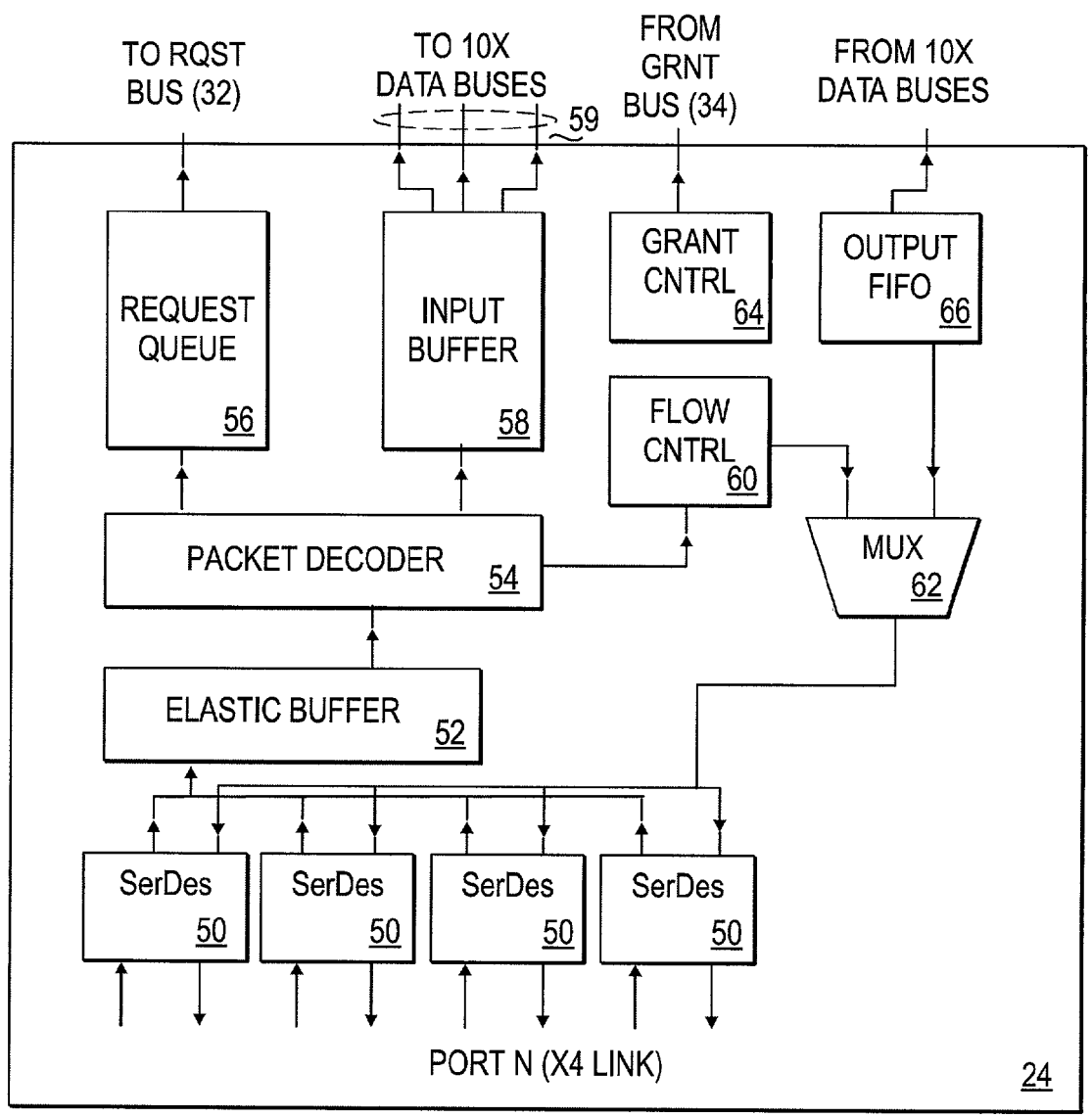
FIG. 4 is a diagrammatic representation of communications port, according to an exemplary embodiment of the present invention, which may be employed within a datapath.

Turning now to the communications ports 24, FIG. 4 is a block diagram providing further architectural details of an exemplary communications port 24 as may be implemented within the datapath 20. While the datapath 20 of FIGS. 3A and 3B is shown to include eight×4 duplex communications ports 24, the present invention is not limited to such a configuration. Referring specifically to FIG. 4, each communications port 24 is shown to include four Serializer-Deserializer circuits (SerDes's) 50 via which 32-bit words are received at and transmitted from a port 24. Each SerDes 50 operates to convert a serial, coded (8B10B) data bit stream into parallel byte streams, which include data and control symbols. Data received via the SerDes's 50 at the port 24 is communicated as a 32-bit word to an elastic buffer 52. The elastic buffer 52 has two primary functions, namely:

To accommodate frequency differences (within a specified tolerance) between clocks recovered from an incoming bit stream and a clock local to the datapath 20; and To accommodate skew between symbols being received at the datapath 20 on four serial data channels.

Incoming data is further synchronized with a core clock as it is propagated through the elastic buffer 52.

Figure 5:
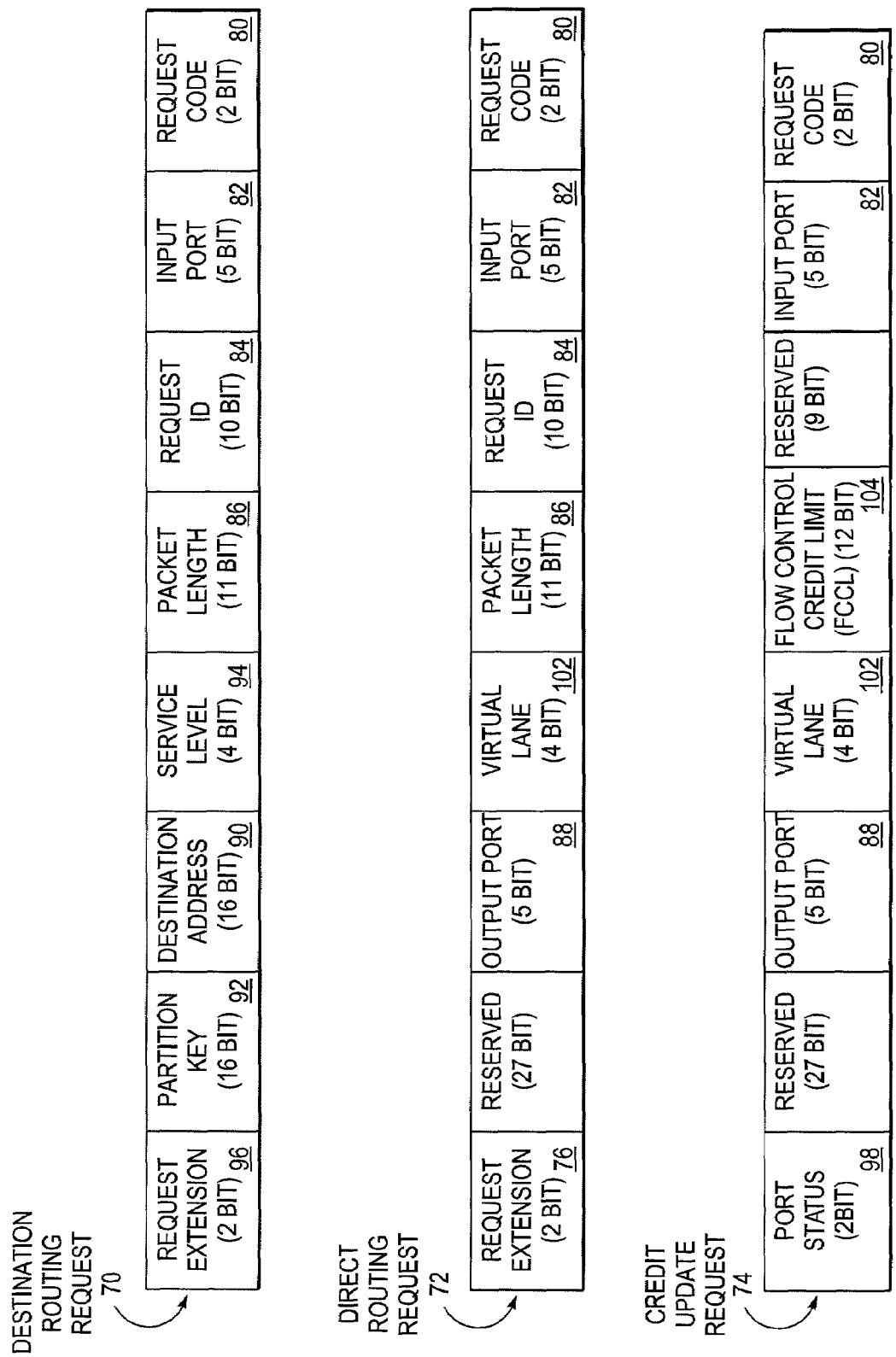
FIG. 5 illustrates exemplary packet transfer requests and an exemplary credit update request.

From the elastic buffer 52, packets are communicated to a packet decoder 54 that generates a request, associated with a packet, which is placed in a request queue 56 for communication to the arbiter 36 via the request bus 32. In the exemplary embodiment of the present invention, the types of requests generated by the packet decoder 54 for inclusion within the request queue 56 include packet transfer requests and credit update requests. FIG. 5 illustrates two examples of packet transfer requests, namely a destination routing request 70 and a direct routing request 72. An exemplary credit update request 74 is also shown.

Return to FIG. 4, each communications port 24 is also shown to include a 20 Kbyte input buffer 58, the capacity of which is divided equally among data virtual lanes (VLs) supported by the datapath 20. Virtual lanes are, in one embodiment, independent data streams that are supported by a common physical link. Further details regarding the concept of "virtual lanes" are provided in the InfiniBand™Architecture Specification, Volume 1, Oct. 24, 2000.

The input buffer 58 of each port 24 is organized into 64-byte blocks, and a packet may occupy any arbitrary set of buffer blocks. A link list keeps track of packets and free blocks within the input buffer 58.

Each input buffer 58 is also shown to have three read port-crossbar inputs 59.

A flow controller 60 also receives input from the packet decoder 54 to generate flow control information (e.g., credits) that may be outputted from the port 24 via a multiplexer (MUX) 62 and the SerDes 50 to other ports 24. Further details regarding an exemplary credit-based flow control are provided in the InfiniBand™Architecture Specification, Volume 1.

The communications port 24 also includes a grant controller 64 to receive resource grants 180 from the arbiter 36 via the grant bus 34. FIG. 8 provides an example of a grant 180.

An output FIFO 66 has sufficient capacity to hold a maximum-sized packet, according to a communications protocol supported by the datapath 20. The output FEFO 66 provides elasticity for the insertion of inter-frame symbols, and flow control messages, between packets. The output FIFO 66 furthermore provides speed matching for moving packets from x4 to x1 ports.

Returning to FIG. 5, within the routing requests 70 and 72, a request code 80 identifies the request type, an input port identifier 82 identifies a port 24 from which the request was issued, and a request identifier 84 is a "handle" identifier for a request that allows the grant controller 64 of a port to associate a grant 180 with a specific packet. For example, the request identifier 84 may be a pointer to a location within the input buffer 58 of a communications port 24. The request identifier 84 is necessary as a particular port 24 may have a number of outstanding requests that may be granted by the arbiter 36 in any order.

A packet length identifier 86 provides information to the arbiter 36 regarding the length of a packet associated with a request. An output port identifier 88 of the direct routing request 72 identifies a communications port 24 to which the relevant packets should be directed. In lieu of an output port identifier 88, the destination routing request 70 includes a destination address 90 and a partition key 92. A destination routing request 70 may also include a service level identifier 94, and a request extension identifier 96 that identifies special checking or handling that should be applied to the relevant destination routing request 70. For example, the request extension identifier 96 identifies that an associated packet is a subset management packet (VL15), a raw (e.g., non-Infiniband) packet, or a standard packet where the partition key is valid/invalid.

The exemplary credit update request 74 includes a port status identifier 98 that indicates whether an associated port, identified by the port identifier 100, is online and, if so, the link width (e.g., 12×, 4× or 1×). Each credit update request 74 also includes a virtual lane identifier 102 and a flow control credit limit 104.

The virtual lane identifier 102 indicates for which virtual channel credit information is updated. The flow control credit limit 104 is a sum of a total number of blocks of data received (modulo 4096) at a remote receiver on the relevant virtual lane, plus the number of 64-byte blocks (credit units) the remote receiver is capable of receiving (or 2048 if the number exceeds 2048) on the given virtual lane.

To compute the number of available credits, the resource allocator 40 subtracts the total number of blocks sent on the relevant virtual lane (modulo 4096). This computation counts packets that have been sent after the remote receiver sent a flow control message, thus making the credit forwarding mechanism tolerant of link delays. The effective computation is:

Available Credits=Reported Credits−(value of total blocks sent−remote value of total blocks received).

Arbiter

Figure 6:
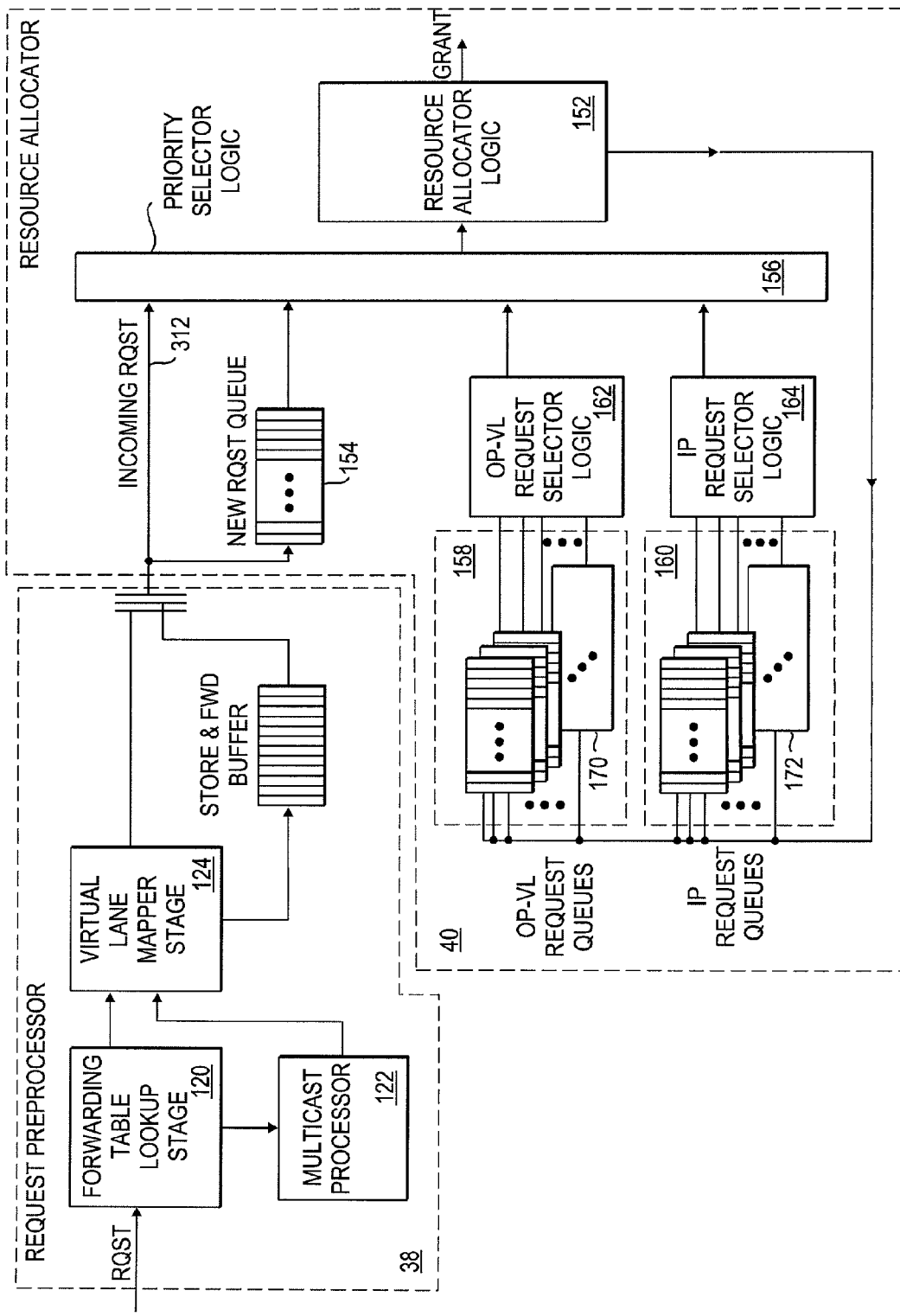
FIG. 6 is a block diagram illustrating the conceptual architecture of an arbiter, according to an exemplary embodiment of the present invention.

FIG. 6 is a conceptual block diagram of the arbiter 36, according to an exemplary embodiment of the present invention. The arbiter 36 is shown to include the request preprocessor 38 and the resource allocator 40. As discussed above, the arbiter 36 implements a central arbitration scheme within the datapath 20, in that all requests and resource information are brought to a single location (i.e., the arbiter 36). This offers certain advantages in that a central, consolidated view of resource availability and demand allows efficient resource allocation and potentially increased throughput. It should however be noted that the present invention may also be deployed within a distributed arbitration scheme, wherein decision making is performed at local resource points to deliver potentially lower latencies.

The arbiter 36, in the exemplary embodiment, implements serial arbitration in that one new request is accepted per cycle, and one grant is issued per cycle. The exemplary embodiment implements serialization as it is envisaged that an interconnect device including the datapath 20 will have an average packet arrival rate of less than one packet per clock cycle. Again, in deployments where the average packet arrival rate is greater than one packet per clock cycle, the teachings of the present invention may be employed within an arbiter that implements parallel arbitration.

Dealing first with the request preprocessor 38, a request (e.g., a destination routing, direct routing or credit update request 70, 72 or 74) is received on the request bus 32 at a forwarding table lookup stage 120 that includes both unicast and multicast forwarding tables (not shown). Specifically, a packet's destination address 90 is utilized to perform a lookup on both the unicast and multicast forwarding tables. If the destination address is for a unicast address, the destination address 90 is translated to an output port number. On the other hand, if the destination is for a multicast group, a multicast processor 122 spawns multiple unicast requests based on a lookup in the multicast forwarding table.

From the forwarding table lookup stage 120, a request is forwarded to a virtual lane mapper stage 124 where a request's service level identifier 94, input port identifier 82 and output port identifier 132 (determined at stage 120) are utilized to perform a lookup in a virtual lane map (not shown) and to output a virtual lane identifier.

Accordingly, the output of the request preprocessor 38 is a modified request that is derived from a request, such as any of those shown in FIG. 5.

FIG. 7 is a diagrammatic representation of exemplary modified resource requests 42 that may be outputted from the request preprocessor 38 to the resource allocator 40. Taking a valid packet transfer request 130 as an example, it will be noted that this request 130 includes an output port identifier 132 generated at the forwarding table lookup stage 120 and a virtual lane identifier 134 generated at the virtual lane mapper stage 124.

A total grant count value 136 is also included within the request 130. The total grant count value 136 is generated at the forwarding table lookup stage 120, and is utilized to track multicast requests.

Other fields within the valid packet transfer request 130 include a request code 138 that identifies a request type and input port identifier 140 that identifies the port 24 from which the request originated, a request identifier 142 that uniquely identifies the request, a packet length value 144 that indicates the number of 4-byte words within a packet, a transfer rate value 146 that identifies the speed at which the packet will be sent through the crossbar 22 of the datapath 20 and a reserved field 148.

The error packet transfer request 128 is similar to the request 130, but includes an error code 150 that identifies a unique error usually detected within the request preprocessor, but sometimes detected in the resource allocator 40.

The credit update request 126 is shown to include substantially the same information as the credit update request 74 illustrated in FIG. 5.

Returning to FIG. 6, a modified incoming request (e.g., a modified resource request 42 such as any of the requests 126, 128 or 130) 312 is received at the resource allocator 40 from the request preprocessor 38. An incoming (or just-arrived) modified request 312 may proceed directly to resource allocator logic 152, if there is no contention with further pending requests stored in a new request queue 154 that are awaiting processing by the resource allocator logic 152. If such contention does exist, an incoming modified request 312 is placed at the back of the new request queue 154.

As stated above, FIG. 6 is a conceptual diagram of the arbiter 36, and the various queues and selectors described herein may not be physically implemented as discrete components or logic blocks. For example, the request queues discussed are, in one embodiment, each implemented as link lists within a single pending request buffer. Nonetheless, for a conceptual understanding of the present invention, it is useful to make reference to FIG. 6.

The resource allocator 40 is shown to include priority selector logic 156 that implements a priority scheme to feed resource requests from one of four sources to the resource allocator logic 152. The four sources from which the priority selector logic 156 selects a resource request are: (1) an incoming request 312; (2) the new request queue 154; (3) a group 158 of output port-virtual lane (OP-VL) request queues 170; and (4) a group 160 of input port (IP) request queues 172. The group 158 of output port-virtual lane (OP-VL) request queues 170 has output port-virtual lane (OP-VL) request selector logic 162 associated therewith for performing a selection of requests from within the group 158 of queues for presentation to the priority selector logic 156. Similarly, the group 160 of input port (IP) request queues has input port request selector logic 164 associated therewith to select a request for presentation to the priority selector logic 156. It will be noted that two levels of selection logic are employed for these groups of queues. A first level of selection logic is employed to select requests from a group 158 or 160 of queues associated with a first resource type (e.g., output port-virtual lane combinations), each queue being associated with a specific instance of the resource type. A second level of selection logic is employed to select between requests that emerge from each group of queues based on a priority scheme.

At a high level, the arbiter 36 employs a two-level allocation policy. The first level of the allocation policy combines flow control credits and port availability in an "all-or-nothing" allocation policy. Considering a request received at the resource allocator logic 152 from the priority selector logic 156, if (1) sufficient flow control credits for a virtual lane identified by the virtual lane identifier 134 of the request are available and (2) if an output port identified by the output port identifier 132 of the request is available, then both the virtual lane and output port identified within the relevant request are allocated to the request by the resource allocator logic 152.

On the other hand, if either insufficient flow control credits for a virtual lane, or the output port itself, are currently unavailable, then no resources (i.e., neither the virtual lane nor the output port) are allocated, and then request is placed at the back of an output port-virtual lane (OP-VL) request queue 170 corresponding to the requested output port and virtual lane.

The second level of the allocation policy is for input buffer read port availability. As this is the second level of the allocation policy, a request must first acquire flow control credits for a virtual lane and a target output port before an input read buffer port is committed by the resource allocator logic 152. Accordingly, once a virtual lane and target output port have been allocated, if an input read buffer port is not available, the relevant request is put on the back of an input port (IP) request queue 172 corresponding to an input port identified within the relevant request by the input port identifier 140.

The output port-virtual lane request selector logic 162 monitors each of the request queues 170 within the group 158 of output port-virtual lane request queues. As flow control credits and output ports become available, the selector logic 162 chooses among pending requests in the group 158 of queues. In an exemplary embodiment of the present invention where the arbiter 36 supports the InfiniBand™ Architecture, the output port-virtual lane request selector logic 162 may implement the InfiniBand VL arbitration scheme.

Similarly, the input port request selector logic 164 monitors each of the input port (IP) request queues 172 within the group 160 as input buffers 58 become available. The selector logic 164 chooses among pending requests utilizing, for example, a simple round-robin selection policy.

Upon the availability of all resources required to satisfy a particular request, the resource allocator logic 152 will issue a grant 180, on the grant bus 34.

FIG. 8 illustrates the content of an exemplary grant 180. The grant 180 contains a number of fields in common with a request, as well as an additional grant code 182, a total blocks sent field 184, and an error code field 186.

Figure 9:
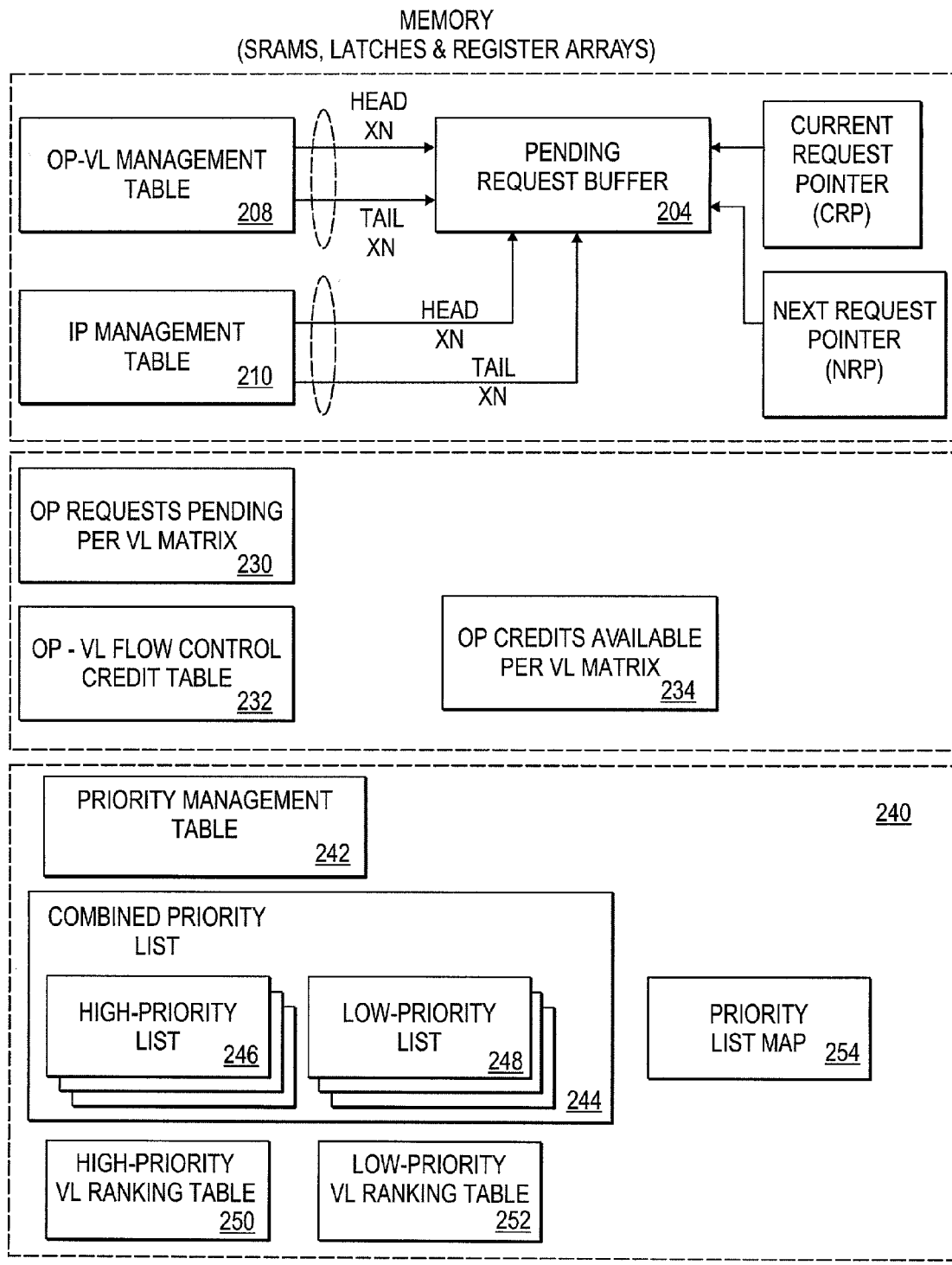
FIG. 9 is a block diagram illustrating exemplary data structures that may be maintained within a memory (e.g., a RAM) associated with an interconnect device.
Figure 10A:
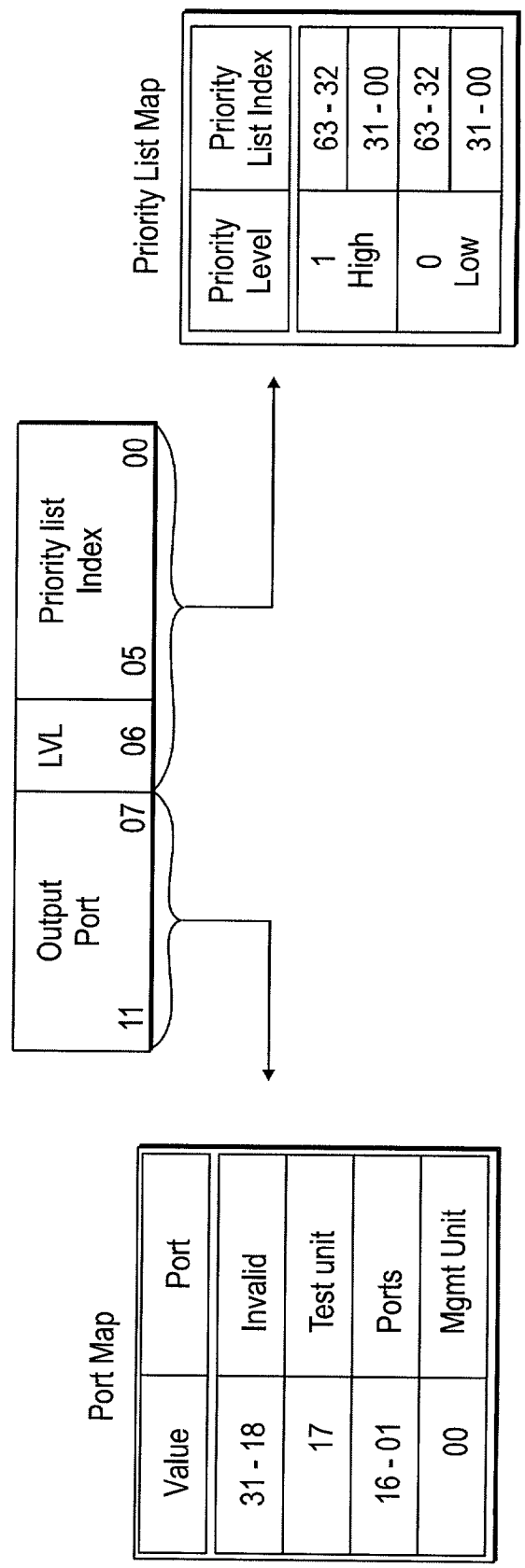
FIGS. 10A, 10B, 10C and 10D respectively illustrate respective address maps for a combined priority list, a high-priority virtual lane ranking table, a low-priority virtual lane ranking table, and a priority list map, as may be maintained within the memory.
Figure 10B:
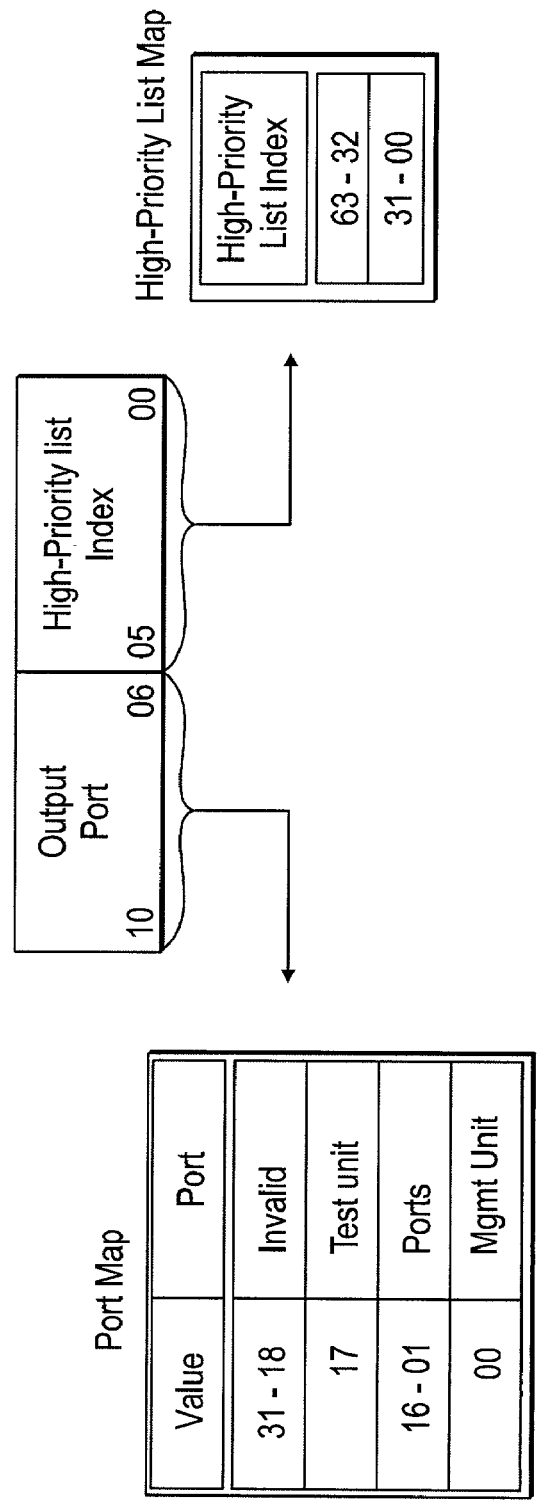
Figure 10C:
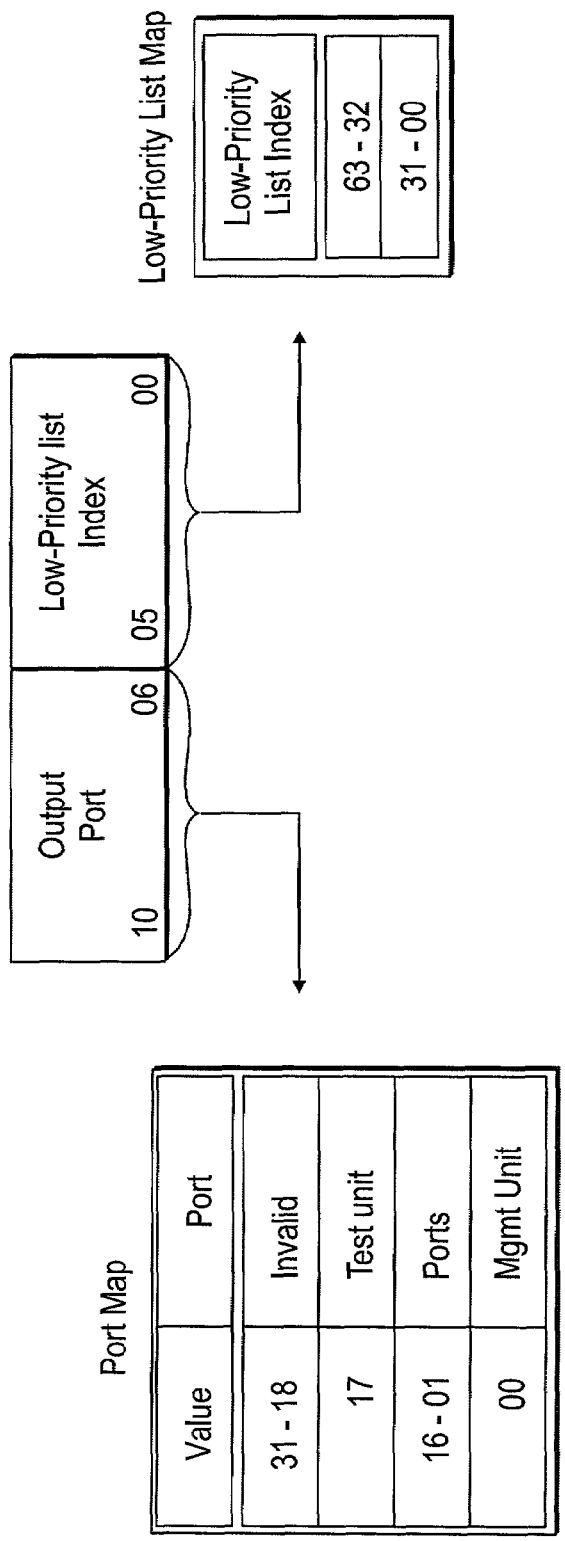
Figure 10D:
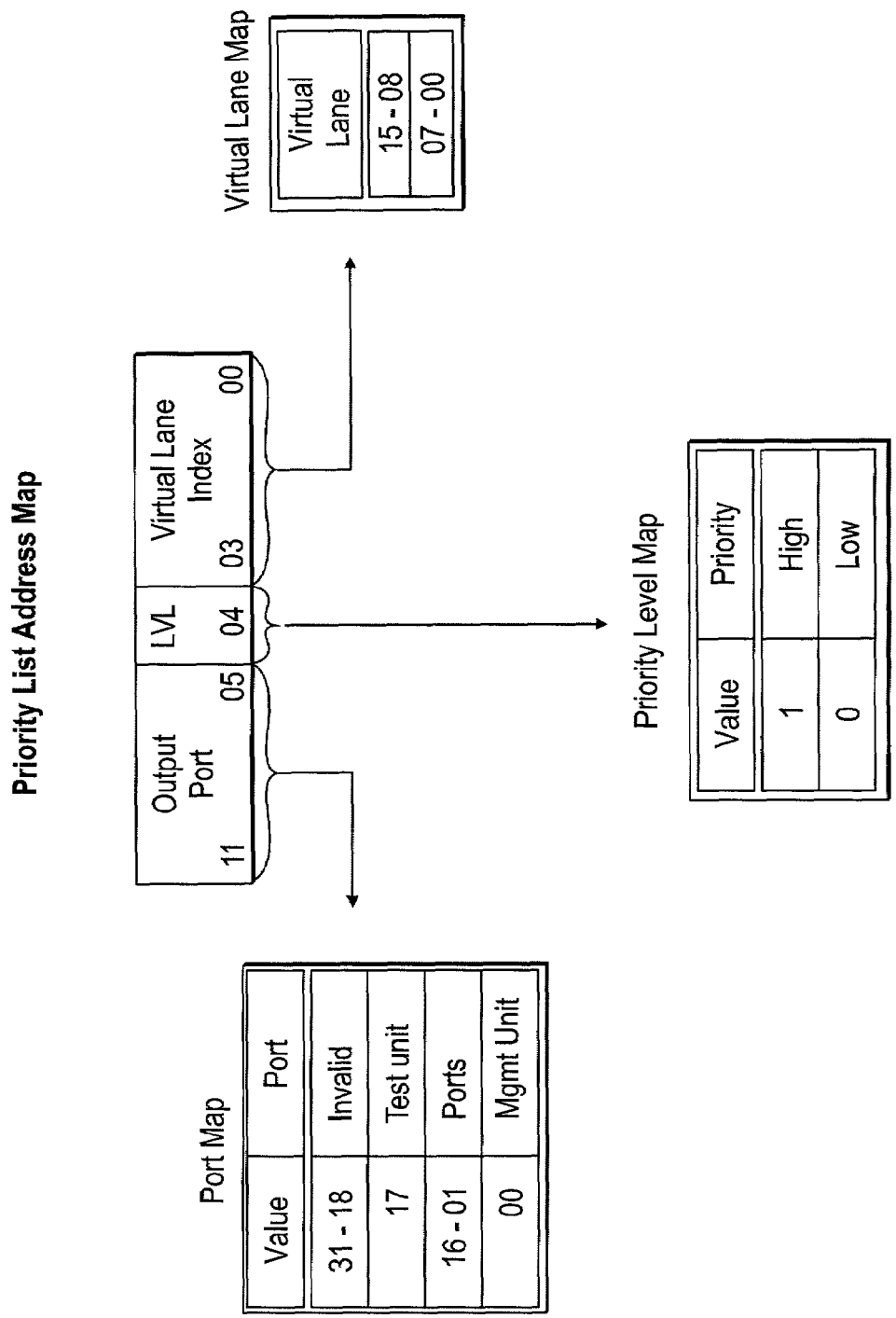

As stated above, FIG. 6 provides a conceptual diagram of the various request queues that may be maintained in the arbiter 36. FIG. 9 is a block diagram illustrating exemplary data structures that may be maintained within a memory 202 (e.g., a collection of Random Access Memories (RAM s) and registers) associated with an interconnect device. At a high level, all requests received at the resource allocator 40 from the request preprocessor 38 are stored within a pending request buffer 204 until grant. In one embodiment, the pending request buffer 204 maintains multiple groups of queues, each group of queues being dedicated to a specific resource type. Accordingly, each group of queues is constituted by queues associated with a specific instance of a relevant resource type (e.g., ports, virtual lanes, etc.). In the exemplary embodiment, the pending request buffer 204 stores the group 158 of output port-virtual lane (OP-VL) request queues 170, the group 160 of input port (IP) request queues 172, the new request queue 154 and a free list. Each queue within the pending request buffer 204 is furthermore maintained as a link list, in that each entry includes a pointer to at least a next (or preceding) entry of the relevant queue.

A number of tables for managing the queues maintained within the pending request buffer 204 are shown to be implemented within the memory 202. Specifically an output port-virtual lane (OP-VL) management table 208 maintains a head and tail pointer for each of the OP-VL request queues 170 of the group 158, an input port (IP) management table 210 stores head and tail pointers for each of the IP request queues 172 of the group 160.

FIG. 9 also illustrates that the memory 202 maintains an output port (OP) requests pending per virtual lane (VL)

matrix 230 that indicates, for each output port, which virtual lanes have requests pending. More specifically, each bit position in the OP requests pending per VL matrix 230 corresponds to a virtual lane with the same number. For example, bit 15 in the matrix 230 corresponds to virtual lane 15, and so. A value of 1 indicates that there are one or more requests pending for a particular output port, virtual lane combination.

The memory 202 also stores an output port-virtual lane (OP-VL) flow control credit table 232 that tracks available flow credits, and the total number of data blocks sent (modulo 4096), for each output port-virtual lane combination.

An output port (OP) credits available per virtual lane (VL) matrix 234 indicates, for each output port, which virtual lanes have flow control credits available. Each bit in the matrix 234 corresponds to one entry in the OP-VL flow control credit table 232. Specifically, each bit position in an OP credits available per VL matrix entry corresponds to the virtual lane with the same number. For example, bit 15 corresponds to virtual lane 15, and so on. A value of 1 indicates that there are some credits available for that output port-virtual lane combination.

FIG. 9 also illustrates that the memory 202 stores a number of data structures 240 that are utilized by the OP-VL request selector logic 162 to arbitrate between pending requests that may be queued in any one or more OP-VL request queues 170. The data structures 240 include a priority management table 242 that keeps track of various virtual lane arbitration values for each output port 24 of a datapath 20. The priority management table 242 includes an entry for each output port 24 of a datapath 20. Table 1, below, provides a description of an exemplary entry within the priority management table 242.

TABLE 1

| Bit Range | Size (bits) | Field Name//Description |
|---|---|---|
| 51:44 | 8 | High-Priority Limit Specifies the maximum number of high-priority packet bytes, in multiples of 4 Kbytes, which can be transmitted before sending a low-priority packet. A value of 255 indicates that the byte count is unbounded. A value of 0-indicates that only one high-priority packet may be sent before sending a low-priority packet A value of 1 indicates that total packets worth about 4 Kbytes can be sent. |
| 43:30 | 14 | High-Priority Residual Credits The current number of high-priority packets bytes, in multiples of 64 bytes, which can be transmitted before sending a low-priority packet. |
| 29:24 | 6 | High-Priority List Index The current index into the High-Priority List. |
| 23 | 1 | High-Priority Residual Credits Valid An indicator of whether the High-Priority Residual Credits field is valid. |
| 22:15 | 8 | High-Priority Residual Credits The current number of packet bytes, in multiples of 64 bytes, which can be transmitted before rotating to the next High-Priority List entry. |
| 14:09 | 6 | Low-Priority List Index The current index into the Low-Priority List. |
| 08 | 1 | Low-Priority Residual Credits Valid An indicator of whether the Low-Priority Residual Credits field is valid. |
| 07:00 | 8 | Low-Priority Residual Credits The current number of packet bytes, in multiples of 64 bytes, that can be transmitted before rotating to the next Low-Priority list entry. |

The data structures 240 include a combined priority list 244 that includes both a high-priority list 246 and a low-priority list 248 for each output port 24. Table 2, below, describes the content of an exemplary entry within the combined priority list 244.

TABLE 2

| Bit Range | Size (bits) | Field Name/Description |
|---|---|---|
| 11:08 | 4 | Virtual Lane Skip entry if virtual lane is 15. |
| 07:00 | 8 | Weight Specifies the maximum number of 64-byte blocks, which may be transmitted from the corresponding virtual lane before moving to the next priority list entry. Skip entry if weight is 0. |

A high-priority virtual lane ranking table 250 is, as will be described in further detail below, derived from the high-priority list 246, and contains an "instantaneous" virtual lane priority ranking for each index in the high-priority list 246. Each entry within the high-priority virtual lane ranking table 250 is a list of virtual lanes, 4-bits each, in priority order, with the highest priority virtual lane in the left-most nibble. Table 3, below, provides a description of an exemplary entry within the high-priority virtual lane ranking table 250.

TABLE 3

| Bit Range | Priority Level | Field Description |
|---|---|---|
| 59:56 | Highest | |
| 55:52 | 2 | Virtual Lane |
| 51:48 | 3 | Virtual Lane |
| 47:44 | 4 | Virtual Lane |
| 43:40 | 5 | Virtual Lane |
| 39:36 | 6 | Virtual Lane |
| 35:32 | 7 | Virtual Lane |
| 31:28 | 8 | Virtual Lane |
| 27:24 | 9 | Virtual Lane |
| 23:20 | 10 | Virtual Lane |
| 19:16 | 11 | Virtual Lane |
| 15:12 | 12 | Virtual Lane |
| 11:08 | 13 | Virtual Lane |
| 07:04 | 14 | Virtual Lane |
| 03:00 | Lowest | Virtual Lane |

Since virtual lane 15, in the exemplary embodiment, has a highest priority, it is not included within the high-priority virtual lane ranking table 250.

A low-priority virtual lane ranking table 252 is similarly derived from the low-priority list 248, and contains an "instantaneous" virtual lane priority ranking for each index in the low-priority list 248. Each entry in the low-priority virtual lane ranking table 252 is a list of virtual lanes, 4-bits each, in priority order, with the highest priority virtual lane in the left-most nibble. Again, since virtual lane 15 has the highest priority in the exemplary embodiment, it need not be included within the low-priority virtual lane ranking table 252. In contrast with the high-priority list, every virtual lane supported by a particular port must be present in the low-priority list 248. Hence, in the exemplary embodiment, every entry in the low-priority virtual lane ranking table 252 contains one instance of each and every virtual lane.

Table 4, below, provides the description of an exemplary entry within the low-priority virtual lane ranking table 252.

TABLE 4

| Bit Range | Priority Level | Field Description |
|---|---|---|
| 59:56 | Highest | |
| 55:52 | 2 | Virtual Lane |
| 51:48 | 3 | Virtual Lane |
| 47:44 | 4 | Virtual Lane |
| 43:40 | 5 | Virtual Lane |
| 39:36 | 6 | Virtual Lane |
| 35:32 | 7 | Virtual Lane |
| 31:28 | 8 | Virtual Lane |
| 27:24 | 9 | Virtual Lane |
| 23:20 | 10 | Virtual Lane |
| 19:16 | 11 | Virtual Lane |
| 15:12 | 12 | Virtual Lane |
| 11:08 | 13 | Virtual Lane |
| 07:04 | 14 | Virtual Lane |
| 03:00 | Lowest | Virtual Lane |

A priority list map 254 contains bit maps (or bit vectors) for each virtual lane within each priority list 246 and 248. These bit maps are derived from the combined priority list 244. The priority list map 254 enables the arbiter 36, as will be described in further detail below, to combinatorially search a priority list for a next entry within either the high- or low-priority lists 246 or 248 containing a given virtual lane. Each entry within the priority list map 254 contains a bit map of the associated priority list for a given virtual lane. The priority list map 254 index specifies the output port, priority level and virtual lane. Bit 0 of the priority list map entry corresponds to entry 0 in the associated priority list.

FIGS. 10A, 10B, 10C and 10D respectively illustrate respective address maps for the combined priority list 244, the high-priority virtual lane ranking table 250, the low-priority virtual lane ranking table 252, and the priority list map 254.

Figure 11:
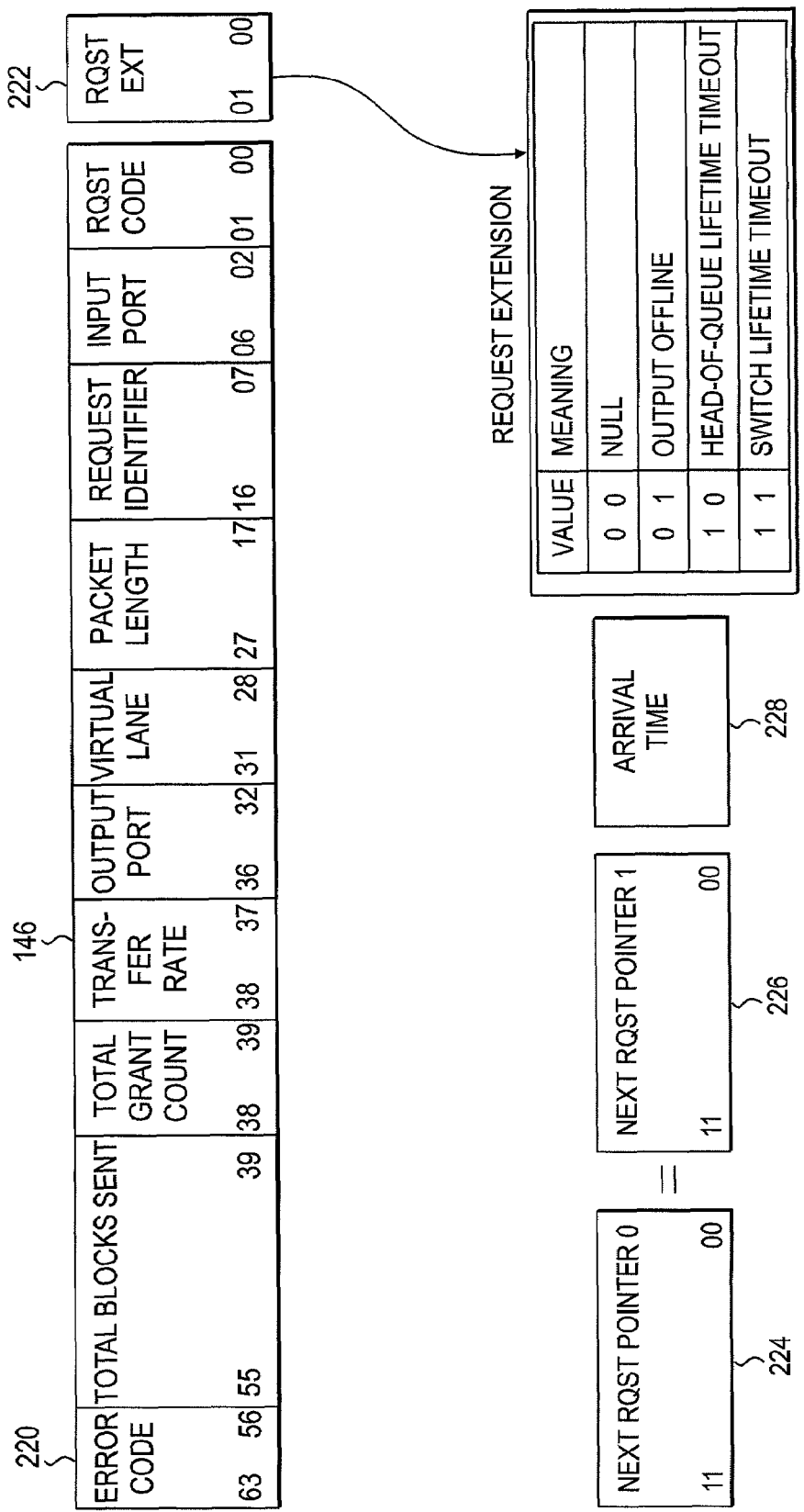
FIG. 11 is a field diagram illustrating fields that may be implemented within each entry within the pending request buffer, according to an exemplary embodiment of the present invention.

Dealing now specifically with the pending request buffer 204, FIG. 11 is a field diagram illustrating fields that may be implemented within each entry within the pending request buffer 204, according to an exemplary embodiment of the present invention. It should be noted that the pending request buffer 204 holds all requests received at the resource allocator 40 and may include 1024 entries to support the datapath 20, when employed in an InfiniBand compliant environment. However, it will be appreciated that where a number of ports and the deployment environment vary, the number of entries may be varied accordingly.

The fields of the pending request buffer 204 illustrated in FIG. 11 are divided into four banks, namely: (1) a request bank 220; (2) a request extension bank 222; (3) a next request pointer 0 bank 224; and (4) a next request pointer 1 bank 226. The request bank 220 stores the content of each request as received from the request preprocessor 38, the request extension bank 222 stores codes for errors detected by the resource allocator 40, the next request pointer 0 bank is utilized for reading a next entry in a relevant request queue (e.g., an OP-VL, an IP or the new request queue), and the next request pointer 1 bank 226 is utilized for reading a next entry in a free list.

The request bank 220 includes an arrival time field 228 that records a request arrival time within the pending request buffer 204.

Figure 12:
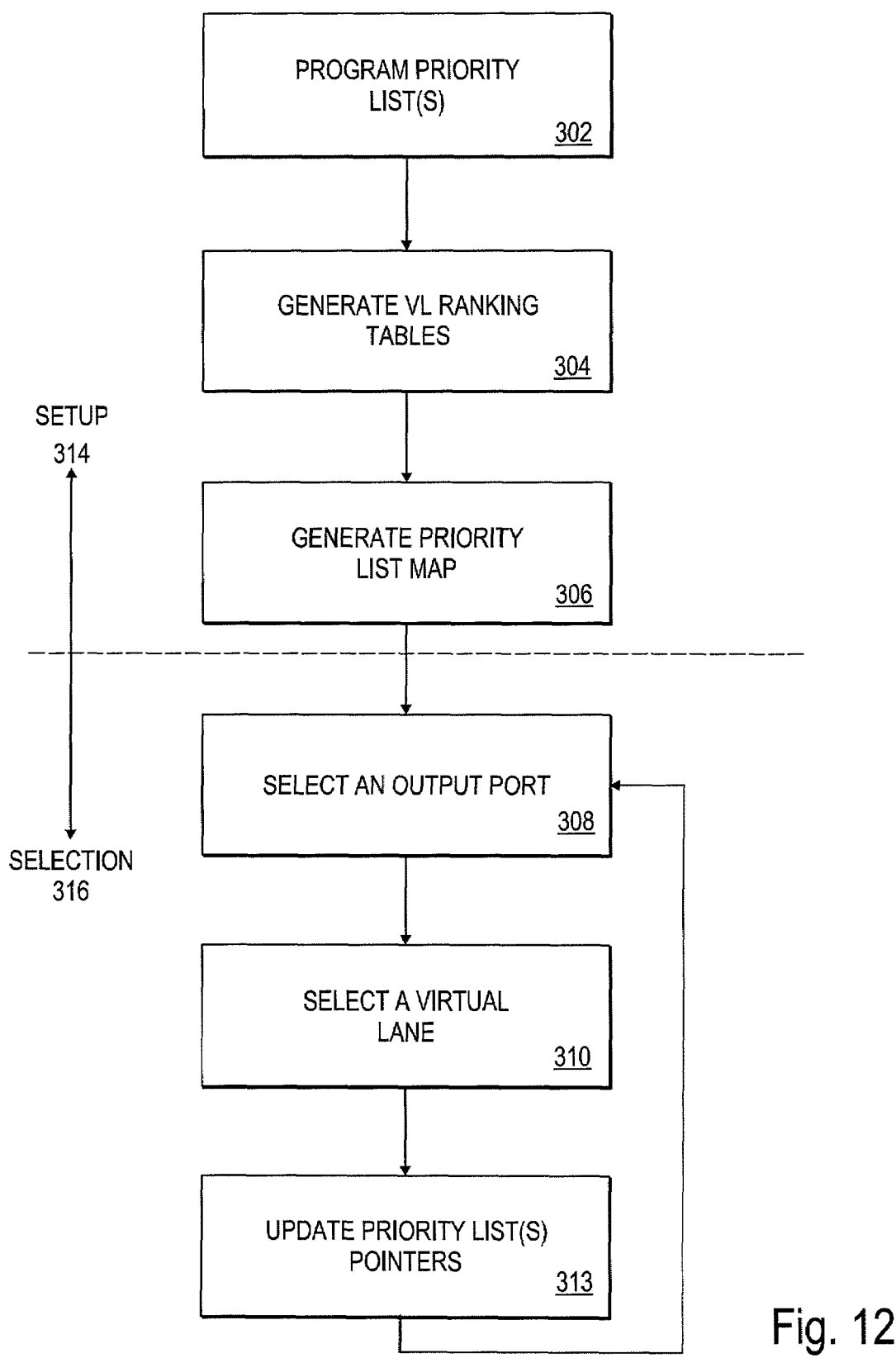
FIG. 12 is a flow chart illustrating a sequence of set-up operations and selection operations that may be performed within an arbiter, according to exemplary embodiment of the present invention, and specifically within a resource allocator within the arbiter, to set up the data structures in a memory associated with the arbiter and to utilize the data structures to perform selection of a resource consumer.

FIG. 12 is a flow chart illustrating a sequence of set-up operations 314 and selection operations 316 that may be performed within the arbiter 36, and specifically within the resource allocator 40, to set up the data structures 240, described above with reference to FIG. 9, and to utilize the data structures 240 to perform selection of a resource consumer in the exemplary form of an output port-virtual lane pair. While the present invention shall be described below within the context of an architecture conforming to the IBA, it will be appreciated that the present invention has a wider application in the allocation of resources within an interconnect or network device (or computer system), where the allocation of resources is performed according to a resource allocation table. Accordingly, in the exemplary embodiment described below, a resource allocation table in the exemplary form of the combined priority list 244 shall be utilized to describe an exemplary implementation of the present invention. The exemplary embodiment also makes reference to resource consumers in the exemplary form of virtual lanes, resource capacity in the exemplary form of bandwidth on a common physical link through the datapath 20 and a resource request in the exemplary form of an output port-virtual lane (OP-VL) request as queued within any one of the OP-VL request queues 170.

Referring to FIG. 12, the set-up operations 314 commence with the programming of the combined priority list 244. An exemplary manner by which the combined priority list 244 may be programmed is provided in the IBA specification.

At block 304, the high-priority and low-priority virtual lane ranking tables 250 and 252 are generated, based on the combined priority list 244, in a manner that will be described in further detail below.

Figure 13:
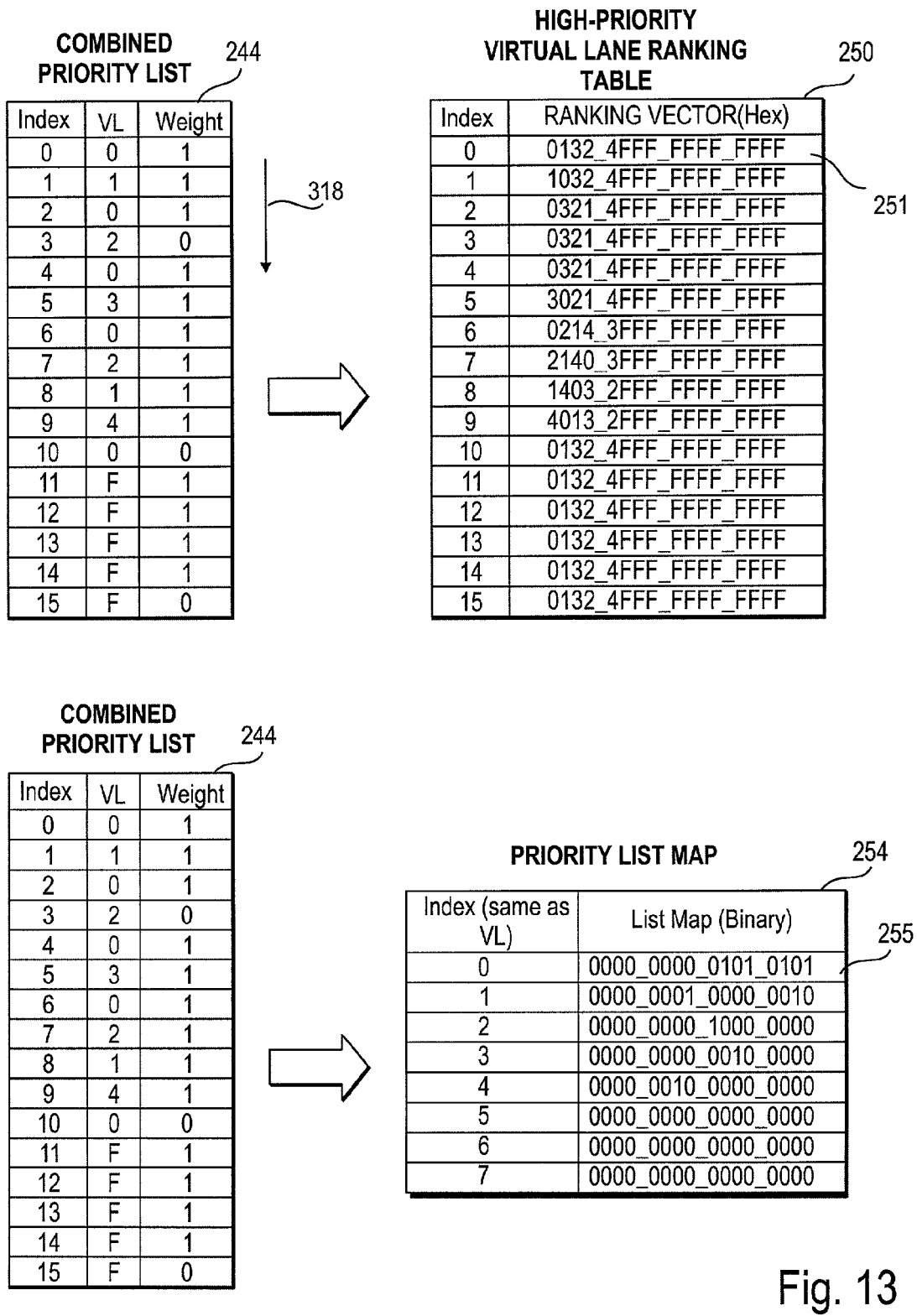
FIG. 13 illustrates an exemplary populated combined priority list, and an exemplary high-priority virtual lane ranking table and an exemplary priority list map that may be generated from the populated combined priority list.

FIG. 13 illustrates an exemplary populated combined priority list 244, and an exemplary high-priority virtual lane ranking table 250 (derived from the combined priority list 244) that may be generated at block 304. It will be noted that each entry within the combined priority list 244 contains a 4-bit virtual lane identifier, and an 8-bit weight value. A value of 0×F for a virtual lane, or a weight value of 0, indicates that a particular entry is not used and should be skipped. Turning now to the high-priority virtual lane ranking table 250, each entry of the table 250 is shown to store a ranking vector 251 that contains a list of virtual lanes in a decreasing order of priority. In the exemplary embodiment, the width of each entry is 32 bits, and the depth of the table 250 is equal to the number of entries supported in the combined priority list 244. A value of 0×F for a virtual lane in a particular ranking vector 251 is used to indicate an unfilled slot.

As stated above, each ranking vector 251 contains a list of virtual lanes in a decreasing order or priority. It will be noted that the order of the virtual lanes within the list represented by the ranking vector 251 is in accordance to an order of appearance within the combined priority list 244, in a direction indicated by the arrow 318, from an entry within the combined priority list 244 to which the relevant ranking vector 251 corresponds. It will also be noted that a list represented by a ranking vector 251 only includes a virtual lane for the first occurrence of the virtual lane within the combined priority list 244 for which bandwidth has been allocated in terms of a weight value. In other words, the order in which virtual lanes appear within a list represented by a ranking vector 251 is determined by whether a downstream entry within the combined priority list 244 is the first entry for a particular virtual lane, and also whether the relevant entry indicates a resource (e.g., bandwidth) allocation to the relevant virtual lane.

Taking the ranking vector 251 having the 0 index in the exemplary ranking table 250 shown in FIG. 13 as an example, it will be noted that the ranking vector 251 represents an ordered list of the following virtual lanes "0 1 3 2 4". Commencing a consideration of the combined priority list 244 at entry 0, it will be appreciated that the 0 and 1 virtual lanes are included within the ranking vector 251 as these are the first occurrences of entries for these virtual lanes, and each of these entries has a non-zero weight value (e.g., a weight value of 1). However, the ranking vector does not again list the virtual lane 0 (entry 2 in the combined priority list 244), as this is the second occurrence of an entry for virtual lane 0 within the combined priority list 244.

The ordered list does not list virtual lane 2 (entry lane 3 in the combined priority list 244) immediately after virtual lane 1, as this entry has a weight value of 0, indicating that no resource capacity is allocated to this virtual lane 2 at entry 3. Jumping to entry 5 of the combined priority list 244, virtual lane 3 is recorded within the ranking vector 251, as this is again the first occurrence of an entry for a virtual lane 3 within the combined priority list 244 that has a non-zero weight value.

In summary, it will be appreciated that each virtual lane can only appear once in each ranking vector 251.

Returning to FIG. 12, at block 306, a priority list map 254 is generated, the priority list map 254 again being based upon the combined priority list 244. Each entry within the priority list map 254 contains a sequence of bits (or a bit vector), which for a particular virtual lane, indicates where entries for that virtual lane appear in the combined priority list 244.

FIG. 13 also illustrates an exemplary priority list map 254 that may be generated from the populated combined priority list 244. For example, the priority list map 254 includes a bit vector 255 for virtual lane 0 that records the locations of entries for virtual lane 0 with non-zero weight values within the combined priority list 244. In the exemplary embodiment, the width of each bit vector 255 equals the depth of the combined priority list 244. The depth of the priority list map 254 equals, in one embodiment, the number of virtual lanes supported by a particular output port.

Moving on now to the selection operations 316 illustrated in FIG. 12, once the data structures 240 described above have been established, the OP-VL request selector logic 162, at a high level, performs three operations, namely the selection of an output port at block 308, the selection of a virtual lane at block 310, and the updating of pointers to the combined priority list 244 at block 313. Further details regarding each of the operations performed at blocks 308, 310 and 313 shall be provided below.

Figure 14:
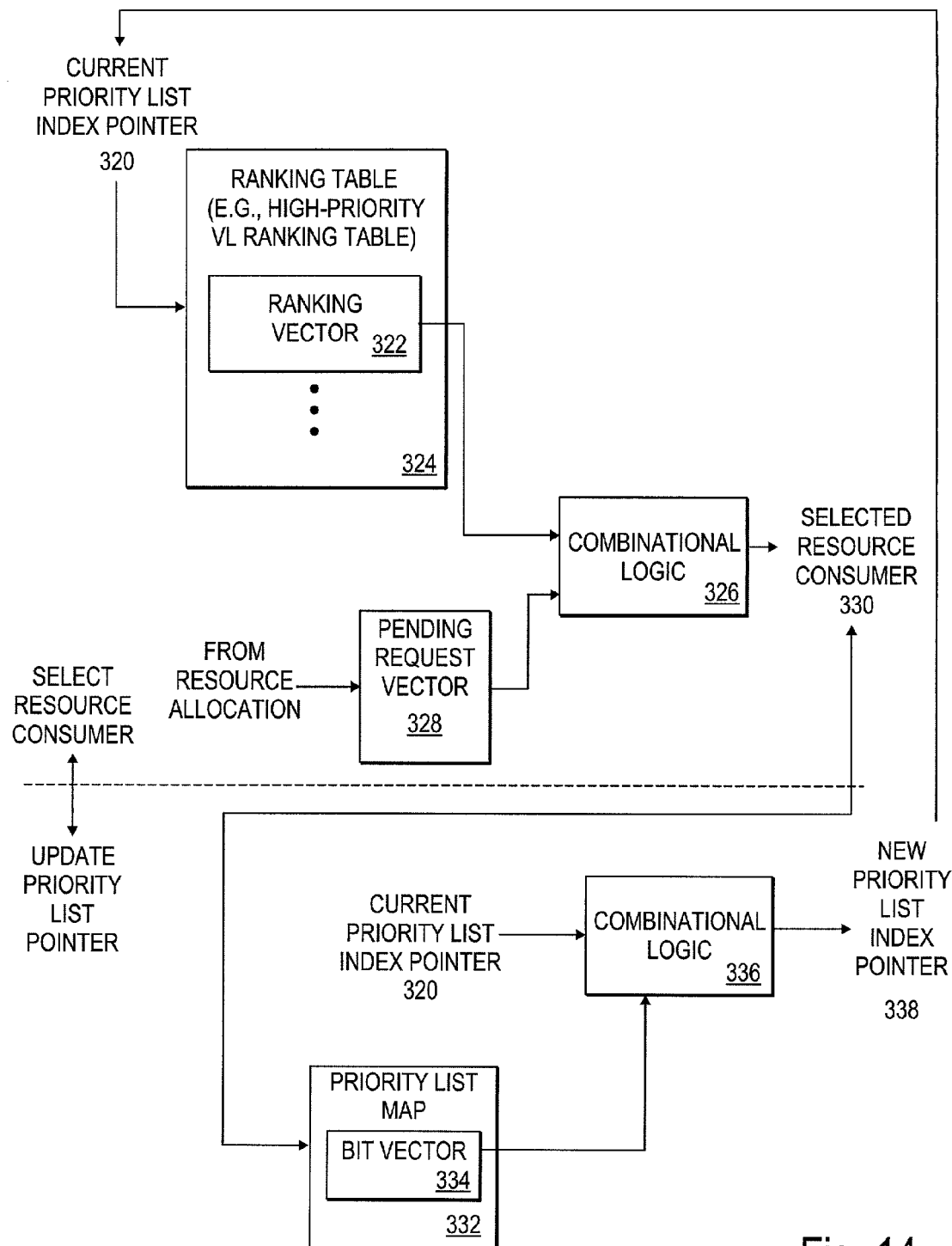
FIG. 14 is a block diagram illustrating, at a high level, a generalized exemplary implementation of a method and system to allocate resources within an interconnect device, a network device or a computer system.

FIG. 14 is a block diagram illustrating, at a high level, a generalized exemplary implementation of a method and system to allocate resources within an interconnect device, a network device or a computer system. A current priority list index pointer 320 is shown to point to a ranking vector 322 within a ranking table 324, the ranking vector 322 comprising an entry of the ranking table 324 corresponding to an entry within a priority list (not shown). As described above, the ranking table 324 is derived from the priority list and populated with ranking vectors 322, as described with reference to FIG. 13. A selected ranking vector 322 is shown to be outputted from the ranking table 324 and to comprise input to combinational logic 326, which operates as a first selector to select a resource consumer.

A pending request vector 328 identifies valid resource consumers, in the exemplary form of virtual lanes, which have sufficient flow credits available to output a request and for which requests are currently pending. In the exemplary embodiment, the pending request vector 328 is generated utilizing the OP requests pending per VL matrix 230 and the OP credits available per VL matrix 234.

The combinational logic 326 utilizes the ranking vector 322 and the pending request vector 328 to select a resource consumer 330 (e.g., a virtual lane). The use of combinational logic 326, which utilizes the ranking vector 322 and the pending request vector 328 as inputs, is advantageous in that, in one embodiment, the combinatorially operation performed thereby allows the selected resource consumer 330 to be selected within one clock cycle (i.e., the same clock cycle).

As mentioned above, the current priority list index pointer 320 that is utilized to perform the lookup on the ranking table 324 is the priority list pointer that indexes a priority list. Following selection of a resource consumer (e.g., a virtual lane), the current priority list index pointer 320 must be updated to identify the next resource consumer (e.g., virtual lane), according to a priority list, to be selected for service. To this end, FIG. 14 illustrates the selected resource consumer 330 being utilized to index a priority list map, and to identify a bit vector 334 in the priority list map corresponding to the selected resource consumer 330 (e.g., a virtual lane). As described above with reference to FIG. 13, the bit vector 334 may comprise a sequence of bits corresponding to entries within the priority list, with set bits indicating the locations of entries for the selected resource consumer 330 within the priority list.

The bit vector 334 and the current priority list index pointer 320 provide input to further combinational logic 336 that, utilizing the index pointer 320 and the bit vector 334, generates a new priority list index pointer, which is thereafter set as the current priority list index pointer 320. In one embodiment, the combinational logic 336 implements a rotating priority selector that uses the current priority list index pointer 320 as the current priority and utilizes the bit vector 334 as if it were a set of requests. The output of this priority selector would be the new (decoded) priority list index pointer 338, which after encoding yields the new priority list index pointer. The rotating priority selector is similar to the one used in selecting the output ports round robin, for example.

Figure 15:
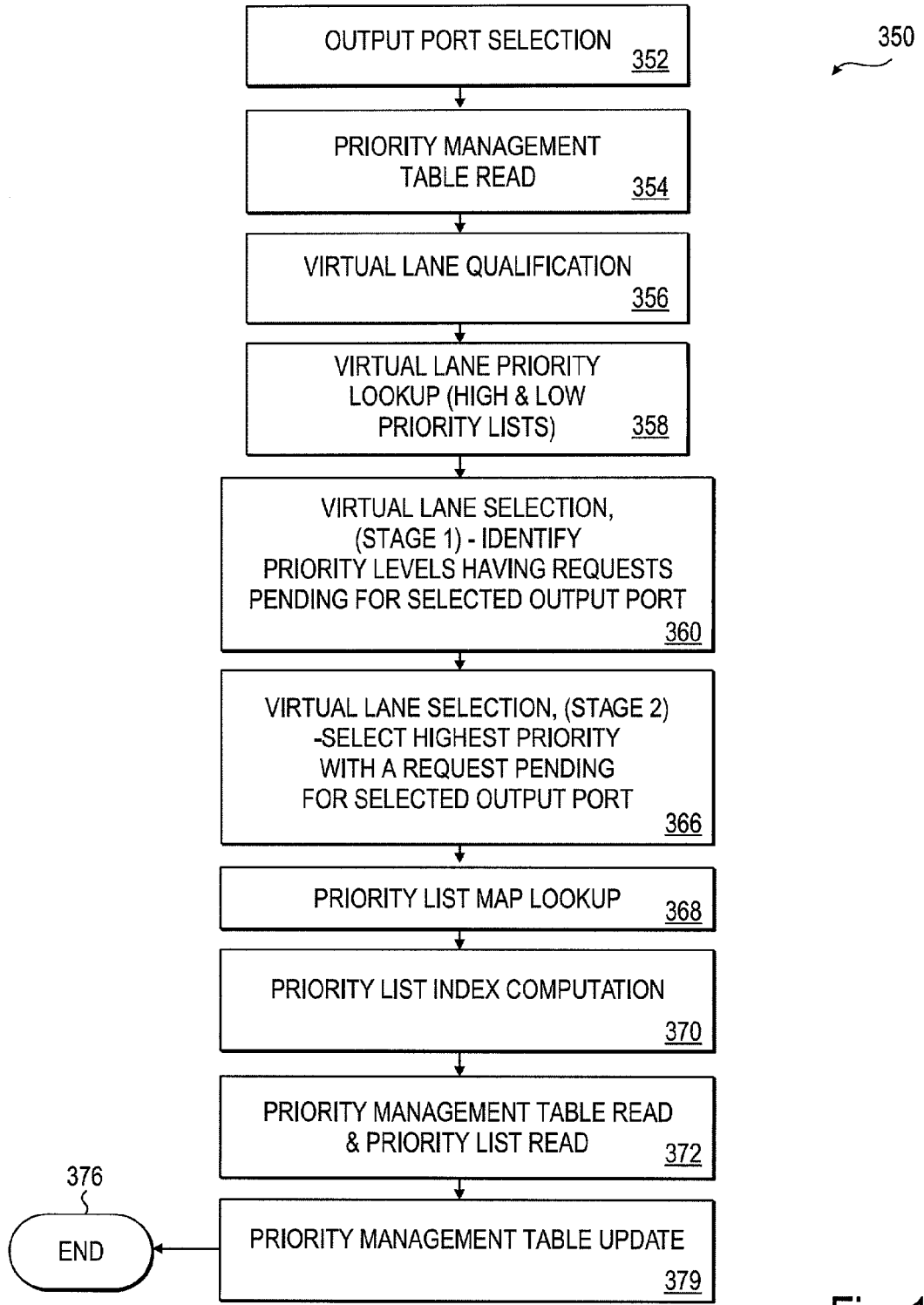
FIG. 15 is a flow chart illustrating a method, according to an exemplary embodiment of the present invention, of allocating a resource capacity within an interconnect device according to a resource allocation table, in the exemplary form of the combined priority list, to a number of resource consumers, in the exemplary form of virtual lanes.

FIG. 15 is a flow chart illustrating a method 350, according to an exemplary embodiment of the present invention, of allocating a resource capacity within an interconnect device according to a resource allocation table, in the exemplary form of the combined priority list 244, to a number of resource consumers, in the exemplary form of virtual lanes. The method 350 is performed by the OP-VL request selector logic 162, illustrated in FIG. 6, which includes combinational logic corresponding to the logics 326 and 336 illustrated in FIG. 14, and which has access to the data structures 240 illustrated in FIG. 9. By way of overview, the OP-VL request selector logic 162 operates to choose an output port-virtual lane combination for which there is a queued request, and for which resources required by the request are likely to be available. In one exemplary embodiment, the method 350 conforms to the virtual lane arbitration scheme defined in the IBA Specification. Again, the present invention is not limited to such a specific and narrow implementation.

As described above with reference to FIG. 6, the resource allocator 40 places requests within an appropriate OP-VL request queue 170 when a target output port is busy and/or there are insufficient flow control credits to service the relevant request. In the exemplary embodiment, there is one OP-VL request queue 170 per output port-virtual lane combination. Status for each queue 170 is provided on a per output port basis and a per queue basis by the resource allocator 40. The status indicates (1) whether there is a request pending, (2) whether there are credits available and (3) whether a request at the head of the queue has timed out. At a high level, the OP-VL request selector logic 162 selects an output port-virtual lane combination, and updates priority list pointer and residual priority credits. Further details regarding these operations will now be provided with reference to FIG. 15.

At block 352, an output port selection operation is performed. Specifically, an output port 24 is selected from among output ports 24 for which OP-VL requests are pending and for which resources are available to satisfy pending requests. Such resources include flow control credits and an output port that would be available at grant. Also, requests that are timed out can be discarded.

Figure 16A:
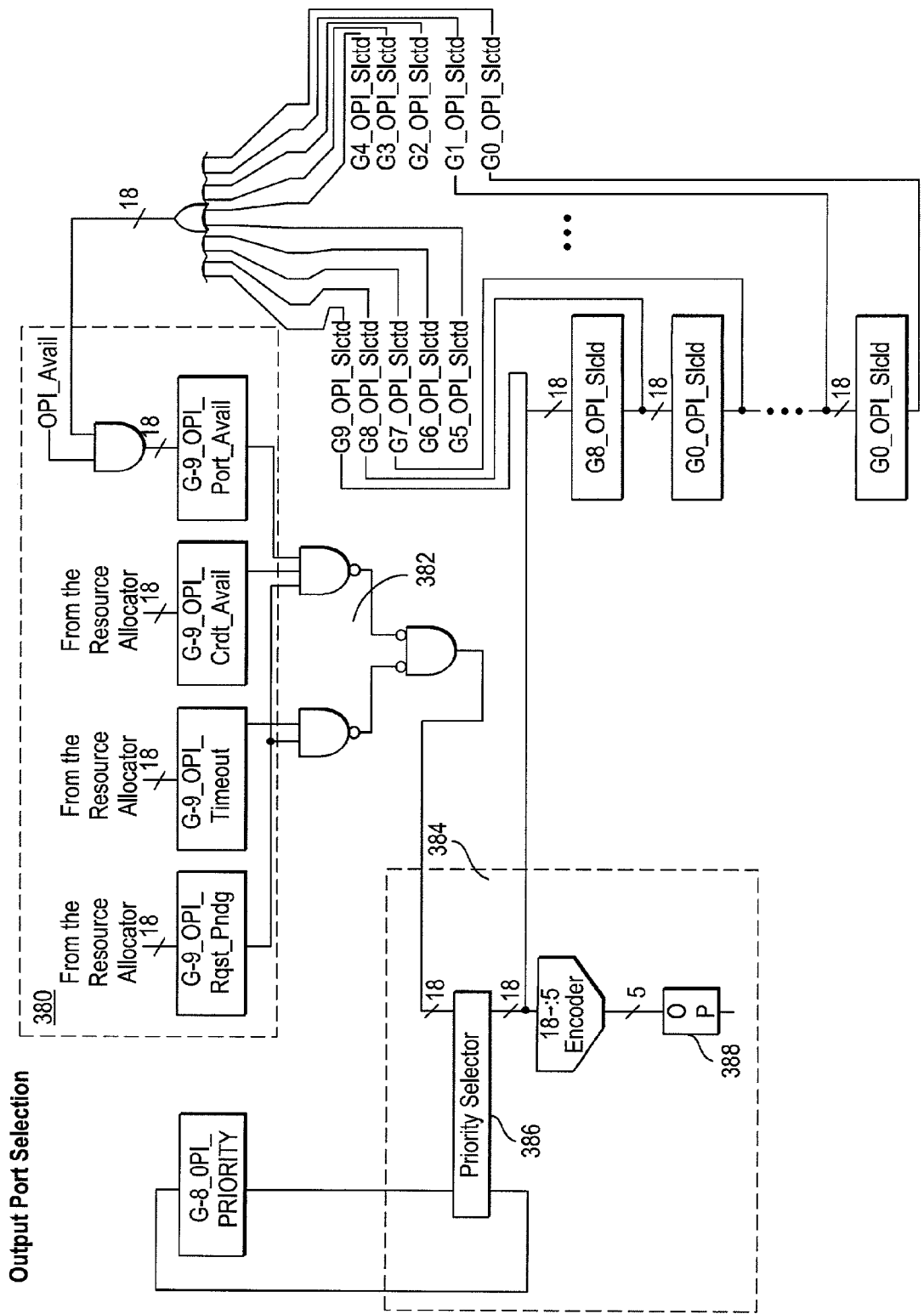
FIG. 16A is a pipeline diagram useful to describe an exemplary embodiment of the output port selection operation.

FIG. 16A is a pipeline diagram useful to describe an exemplary embodiment of the output port selection operation that may be performed at block 352. As indicated at 380, information is collected concerning OP-VL request pending status and resource availability. At 382, a pending request vector 328 is created, the pending request vector 328 indicating pending output port requests for which an output port is available and for which there are flow credits available (or for which there is a time out). At 384, a priority selector 386 operates to select an output port 388 utilizing a round-robin priority. In subsequent selections, output ports 24 that have previously been selected, and that are still progressing through the OP-VL request queues 170, selector and resource allocator pipeline are filtered out.

Figure 16B:
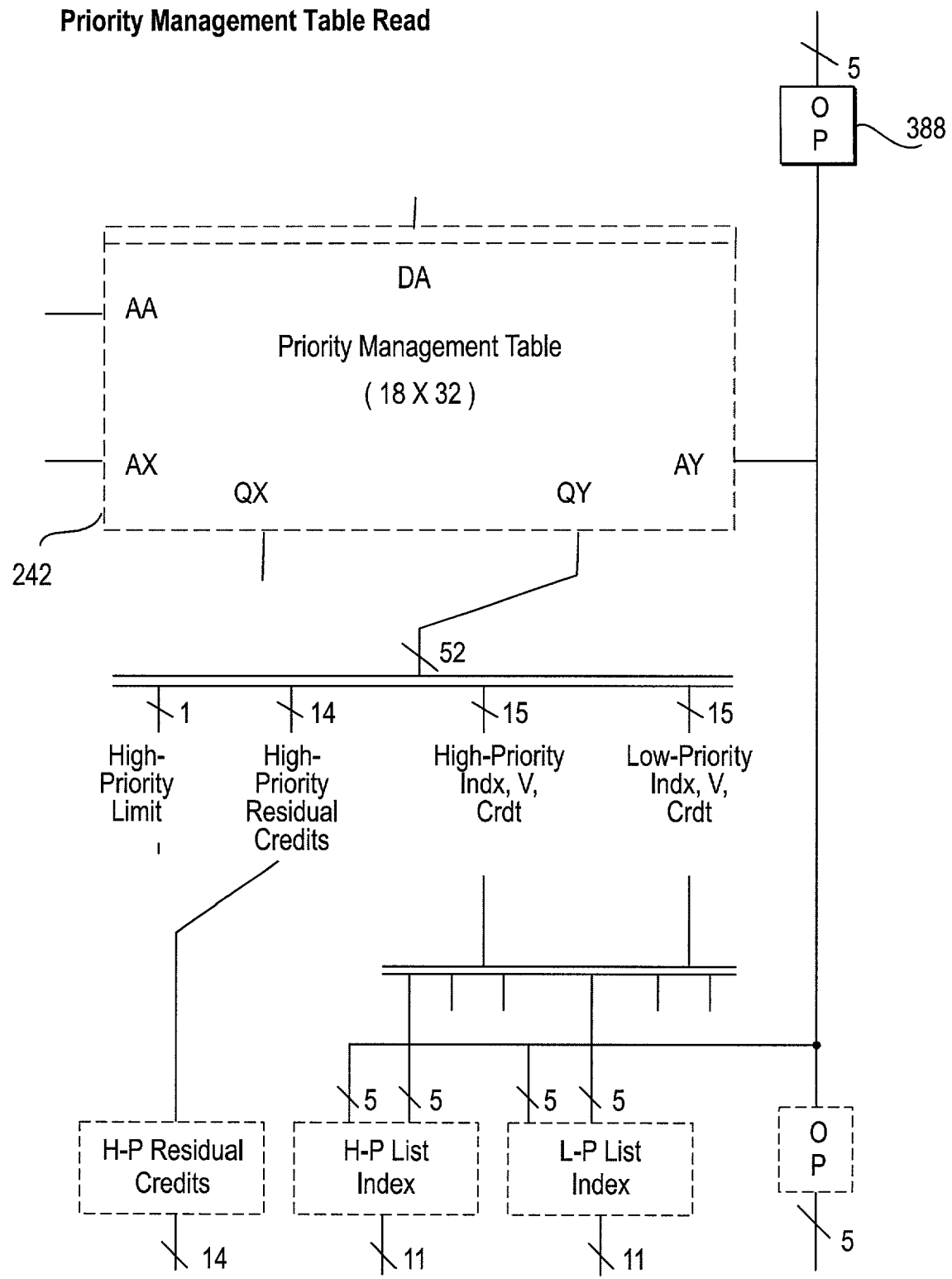
FIG. 16B is a pipeline diagram illustrating an exemplary priority management table read operation.

At block 354 in FIG. 15, a read of the priority management table 242 is performed. Specifically, the selected output port 388 is utilized to index into the priority management table 242 as shown in FIG. 16B, which is a pipeline diagram illustrating the priority management table read operation performed at block 354. The indexes for the high-priority and low-priority lists 246 and 248, as outputted from the priority management table 242, are utilized to read the high-priority virtual lane and low-priority virtual lane ranking tables 250 and 252. Also, the OP-VL request selector logic 162 needs the high priority residual credits (included within the relevant entry of the priority management table 242) to later select between high-priority and low-priority virtual lanes.

At block 356 of FIG. 15, a virtual lane qualification operation is performed to determine for which virtual lanes of the selected output port 388 there are pending requests. The qualification operation performed at block 356 also determines which of the virtual lanes for the selected output port 388 have experienced request timeouts. FIG. 16C is a pipeline diagram illustrating an exemplary manner in which the qualification operation at block 356 may be performed. Specifically, the selected output port 388 is utilized to select entries within an OP requests pending per VL matrix 230, an output port-virtual lane (OP-VL) flow control credit table 232 and a timeout register 394. The outputs of data structures 390–394 are utilized to create the pending request vector 328, indicating, for the relevant output port, virtual lanes for which a request is pending and for which flow control credits are available. A request timeout vector 329 is also created, which identifies events of the selected output port 388 for which requests are pending and for which there is a timeout.

Figure 16D:
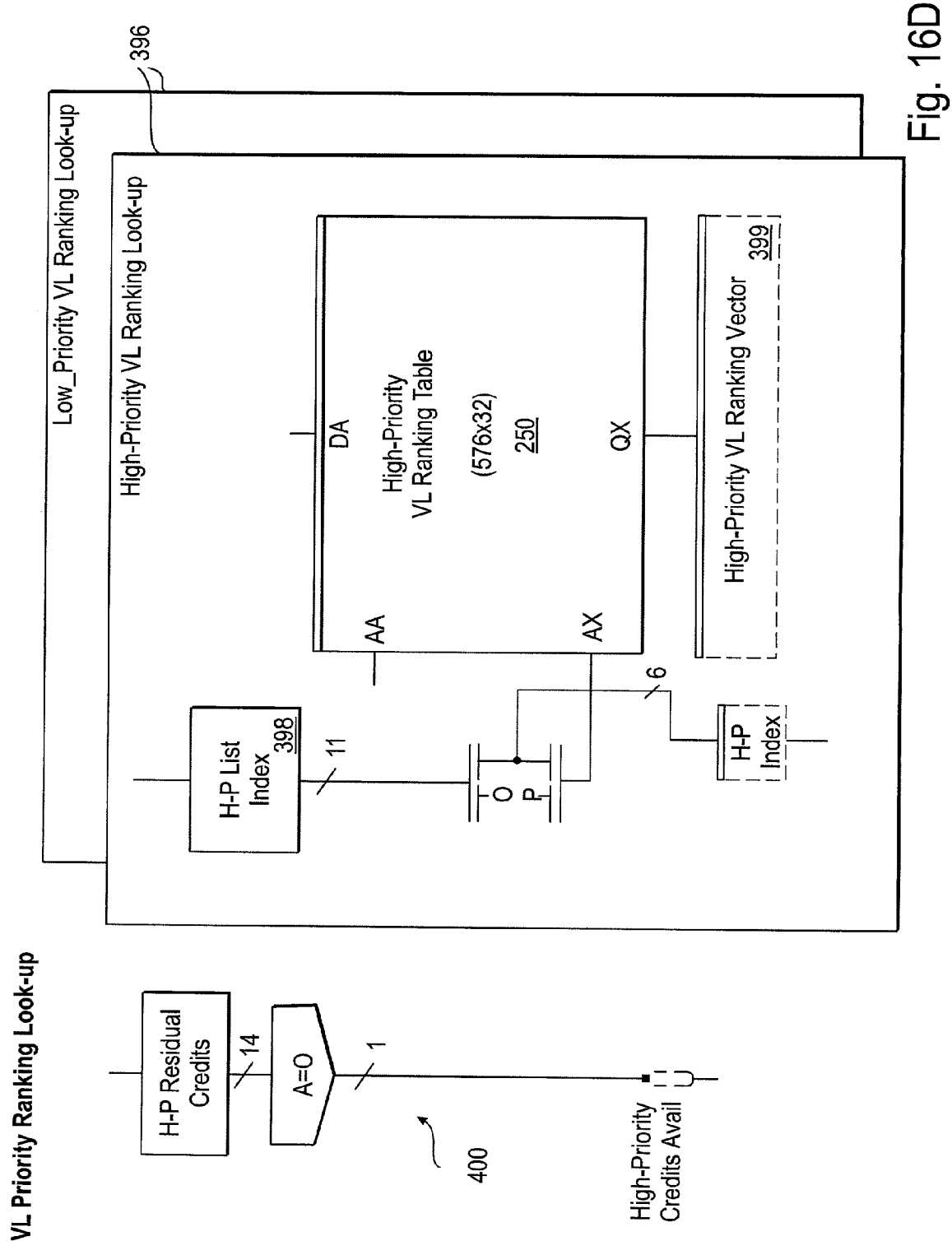
FIG. 16D is a pipeline diagram illustrating exemplary parallel lookups being performed on the ranking tables utilizing a high-priority list index and a low-priority list index (not shown) respectively for a selected output port.

At block 358 of FIG. 15, a virtual lane priority lookup is performed with respect to both the high and low-priority virtual lane ranking tables 252 and 252. It will be recalled that the high and low-priority virtual lane ranking tables 250 and 252 are derived from the high and low-priority lists 246 and 248 of the combined priority list 244. The tables 250 and 252 contain a pre-computed virtual lane priority ranking for each entry of the combined priority list 244. This is advantageous in that, in one embodiment, a one clock cycle read of the ranking tables 250 and 252 may be performed to obtain virtual lane priority rankings, indicated by a ranking vector 251, from any starting position (indicated by a priority list index pointer 320) in the combined priority list 244. As described above with reference to FIG. 14, the output of a ranking vector 251 allows the OP-VL request selector logic 162 to combinatorially choose a highest priority virtual lane among a list of candidates Referring now specifically to FIG. 16D, which is a pipeline diagram illustrating pipeline operations performed at block 358, parallel lookups 396 are performed on the ranking tables 250 and 252 utilizing a high-priority list index 398 and a low-priority list index (not shown) respectively for the selected output port 388. The lookups on the tables 250 and 252 generate a high-priority virtual lane ranking vector 399 and a low-priority virtual lane ranking vector (not shown).

Further, as indicated at 400, a determination is made as to whether there are any high-priority credits remaining for the selected output port 388.

At block 360 of FIG. 15, a first stage high-priority virtual lane selection and low-priority virtual lane selection are performed in parallel. In this first stage, priority levels that have requests pending for the selected output port 388 are identified. A description of the operations performed at block 360 will now be provided with reference to FIG. 16E, which is a pipeline diagram illustrating high-priority virtual lane selection operations. It will be appreciated that substantially similar low-priority virtual lane selection operations are performed in parallel. These low-priority virtual selections operations are accordingly not described or illustrated in any detail.

Referring to FIG. 16E, the high-priority virtual lane ranking vector 399, as generated at block 358 of FIG. 15, has fifteen 4-bit elements, in the exemplary embodiment. Each element specifies a virtual lane. Within the ranking vector 399, virtual lanes are listed in a descending priority from left to right. The left most element has a highest priority, and the right most element has the lowest priority. As previously stated, an element for each virtual lane appears no more than one time in the ranking vector 399. As also stated above, virtual lane 15 in the exemplary embodiment, is the highest priority, and accordingly does not appear in the ranking vector 399. As illustrated at 410 in FIG. 16E, the element for each virtual lane within the ranking vector 399 is decoded to provide a priority bit matrix 412. The priority bit matrix 412 has one row for each priority level, and one column for each virtual lane. No more than one bit is set in any row, or in any column. Accordingly, each priority level has at most one virtual lane, and each virtual lane has at most one priority level.

Following the generation of the priority bit matrix 412, combinational logic 414, which is an exemplary implementation of the combinational logic 326 illustrated in FIG. 14, forms a bit-wise AND between the pending request vector 328 and each row of the priority bit matrix 412. As described above, the pending request vector 328 indicates which virtual lanes are being used by requests pending for the selected output port 388. The output of the AND operation is bit matrix that indicates which priority level, virtual lane combinations have a pending request.

The combinational logic 414 then performs a reduction OR operation on each row of the bit matrix generated by the AND operation, which results in the generation of a high-priority virtual lane hits vector 416, which indicates priority levels which have pending requests. A similar low-priority virtual lane hits vector (not shown) is generated in parallel by the low-priority virtual lane selection operation.

At block 366 of FIG. 15, a stage two virtual lane selection operation is performed to select a highest priority virtual lane with a request pending for the selected output port 388.

Figure 16F:
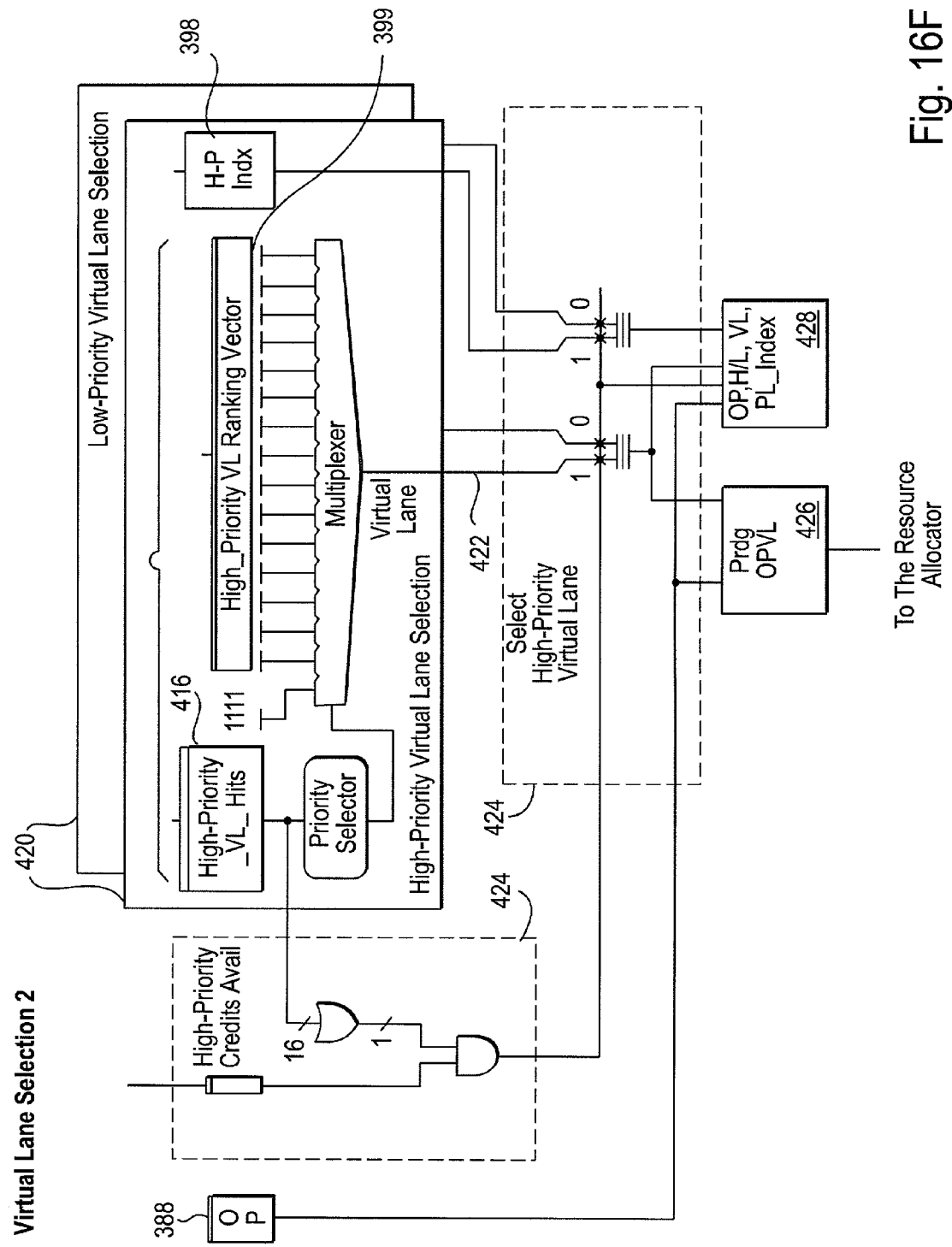
FIG. 16F is a pipeline diagram illustrating stage one of a virtual lane selection operation to identify priority levels having requests pending for a selected output port.

FIG. 16F is a pipeline diagram illustrating operations performed at block 360, according to an exemplary embodiment of the present invention. Specifically, as indicated at 420, low-priority and high-priority virtual lane selection operations are performed in parallel. For example, for the highest priority level of an output port 24 having a pending request, a corresponding virtual lane is selected from the high-priority virtual lane ranking vector 399. To this end, the left most 1-bit (or set bit) in the high-priority virtual lane hits vector 416 is used to select a virtual lane from within the high-priority virtual lane ranking vector 399. The output of the high-priority virtual selection operation 420 is a selected resource consumer in the form of a selected high-priority virtual lane. Similarly, the low-priority virtual lane selection operation outputs a selected low-priority lane (not shown).

Following the output of the selected high-priority and low-priority virtual lanes, a determination is required as to which of these two virtual lane selections should be utilized. In the exemplary embodiments, two conditions must be satisfied for selection of the high-priority virtual lane 422, namely (1) sufficient high-priority credits must be available and (2) there must be a pending output port request for a high-priority virtual lane. Otherwise, the selected low-priority virtual lane is chosen. This determination is indicated as being performed at 424 in FIG. 16F.

The output of operations performed at block 360 is a selected output port-virtual lane combination 426. Also, a further output is a combined output 428 comprising a high/low flag and a corresponding priority list index for subsequent virtual lane arbitration processing steps. The combined output 428 is tagged with the selected output port and the virtual lane.

At block 368 of FIG. 15, a lookup on the priority list map 254 is performed. This lookup, in one embodiment, is a first cycle of a two-cycle process to determine a priority list index for the selected output port, priority level, virtual lane combination indicated in the combined output 428 of block 368.

Figure 16G:
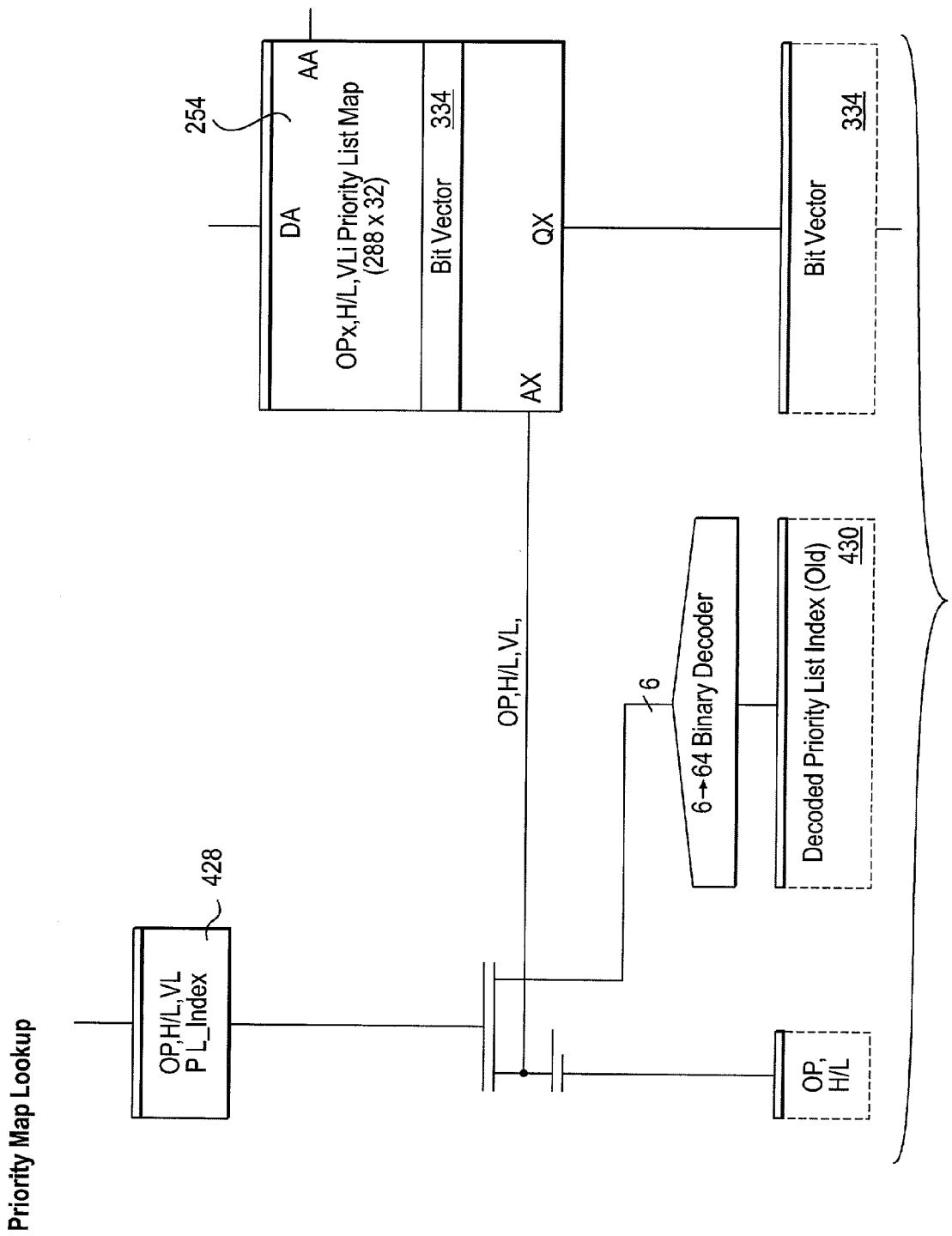
FIG. 16G is a pipeline diagram illustrating stage two of a virtual lane selection operation to select a highest priority with a request pending for a selected output port.

FIG. 16G is a pipeline diagram illustrating operations performed at block 368, according to one embodiment of the present invention. The priority list map 254 illustrated in FIG. 16G, in one embodiment, is a merged map of high-priority list and low-priority lists for all output ports. The priority list map 254 includes an entry, in the form of a bit vector 334, for each virtual lane with each priority list. Each bit vector 334 indicates which entries of a priority list 246 or 248 contain a relevant virtual lane. As illustrated in FIG. 16G, at block 368, the priority list map 254 is read utilizing the output port, priority level (i.e., high or low) and virtual lane information, as extracted from the combined output 428. Accordingly, a bit vector 334 for the appropriate output port-virtual lane combination for the relevant priority level is outputted from the priority list map.

As also indicated in FIG. 16G, the previous priority list index is decoded, thereby generating a previous (or old), decoded previous priority list index 430.

Figure 16H:
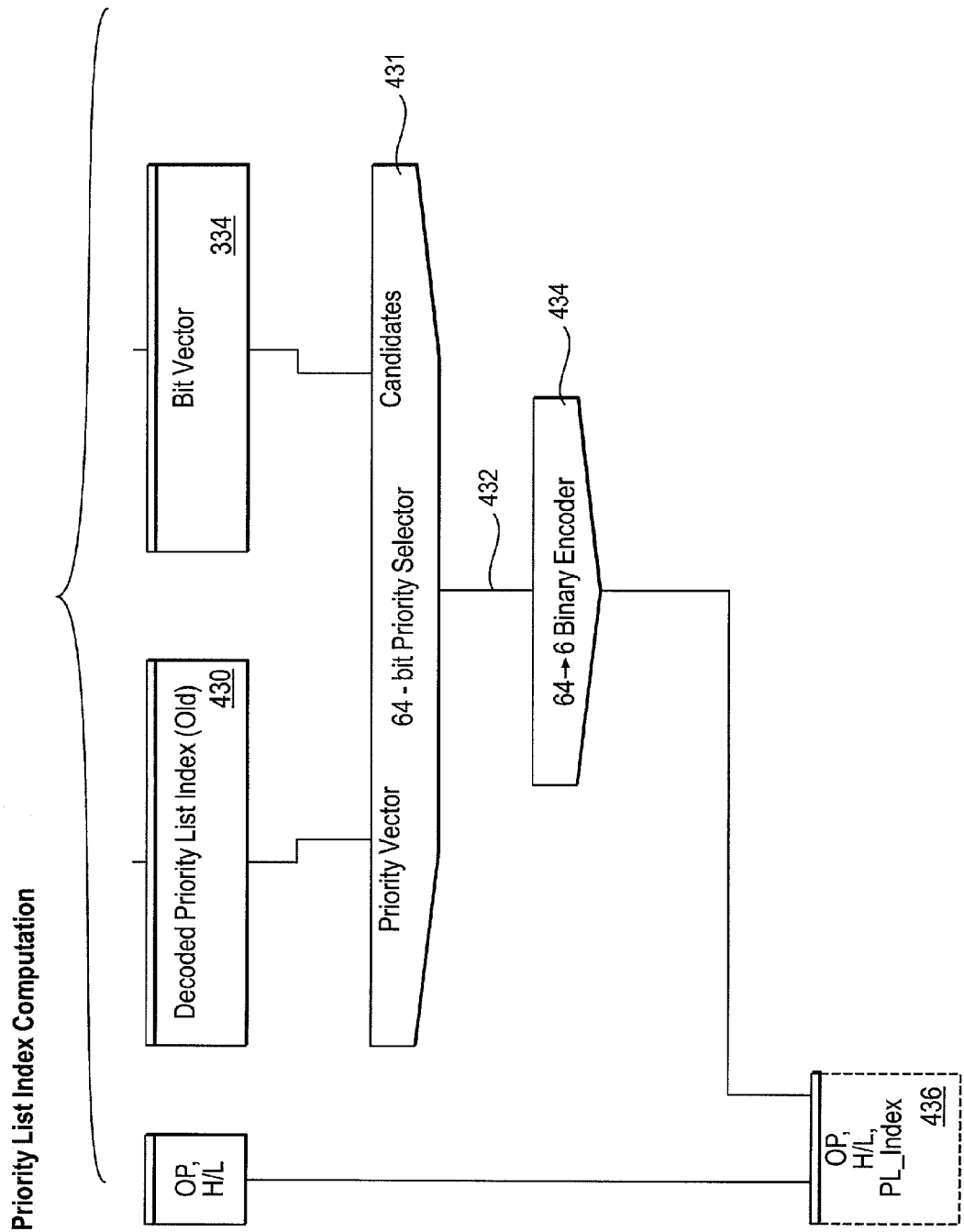
FIG. 16H is a pipeline diagram illustrating an exemplary list index a computation.

At block 370, a priority list index computation is performed. FIG. 16H is a pipeline diagram illustrating the list index computation. Specifically, the priority list index computation is the second stage of the two-stage process, according to an exemplary embodiment of the present invention, to determine the priority list index for a selected output port, priority level, virtual lane combination. As indicated in FIG. 16H, utilizing the previous, decoded priority list index 430, the next list index of the selected virtual lane is located. The bit vector 334, derived from the priority list map 254, for the selected virtual lane and a priority selector 431 permit this search to be done combinatorially. The output of this process is a new priority list index 432, which may correspond to the previous, decoded priority list index 430 if the virtual lanes are the same. A binary encoder 434 operates to encode the new priority list index 432 to generate a second combined output 436 that includes the selected output port, a priority level and the encoded new priority list index.

Figure 16I:
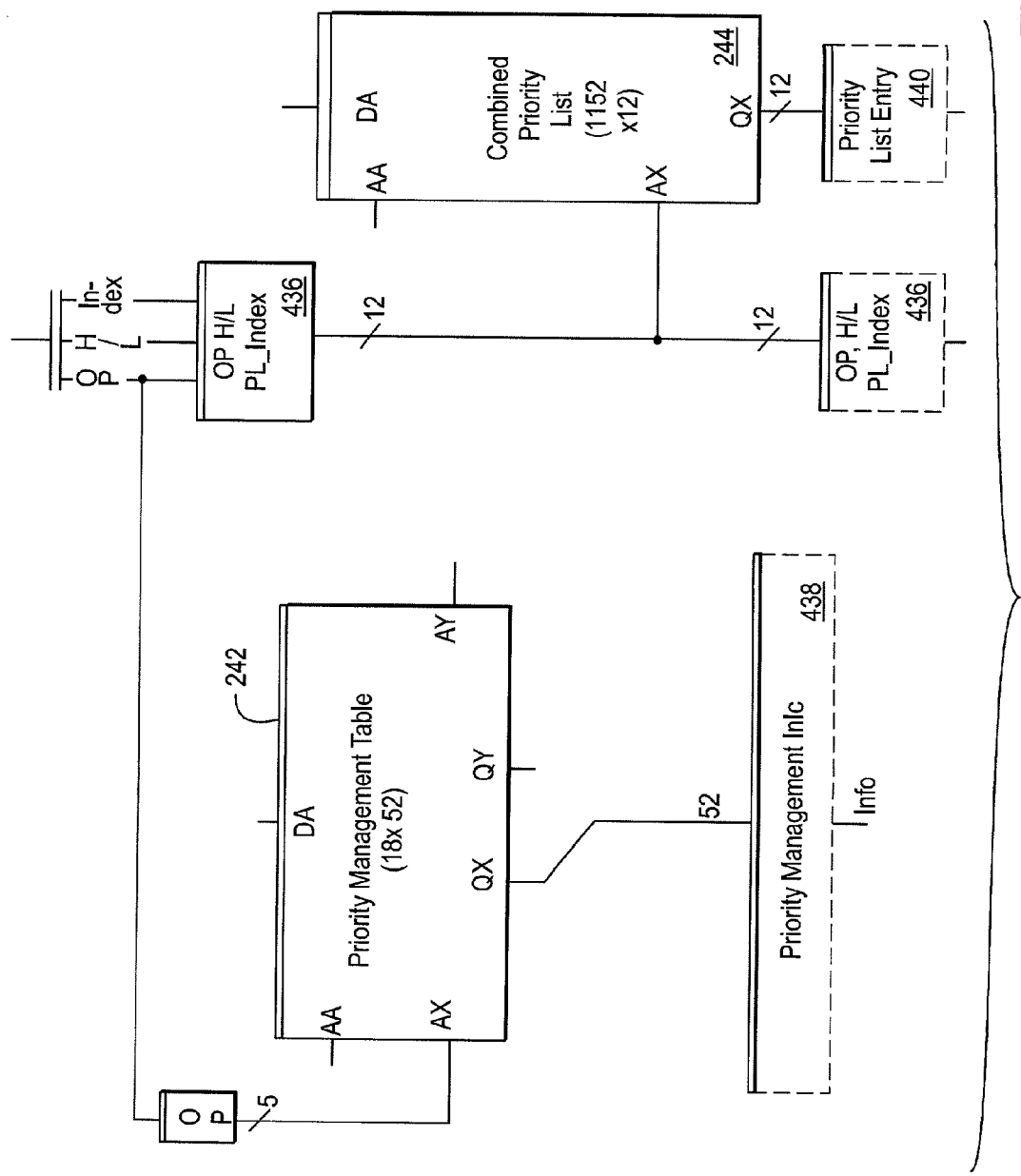
FIG. 16I is a pipeline diagram illustrating exemplary reads of a priority management table and a priority list.

At block 372 of FIG. 15, read operations are performed on the priority management table 242 and the combined priority list 244. Specifically, these operations are performed if a pending OP-VL request is currently being processed by the resource allocator 40, in which a lookup of priority information for that OP-VL request is performed. FIG. 16I is a pipeline diagram illustrating operations that may be performed at block 372. Specifically, the output port 24, indicated in the combined output 436, is utilized to perform a read on the priority management table 242 to output priority management information 438.

Further, a current output port-priority level combination is utilized to perform a read on the combined priority list 244 to output a priority list entry 440.

Figure 16J:
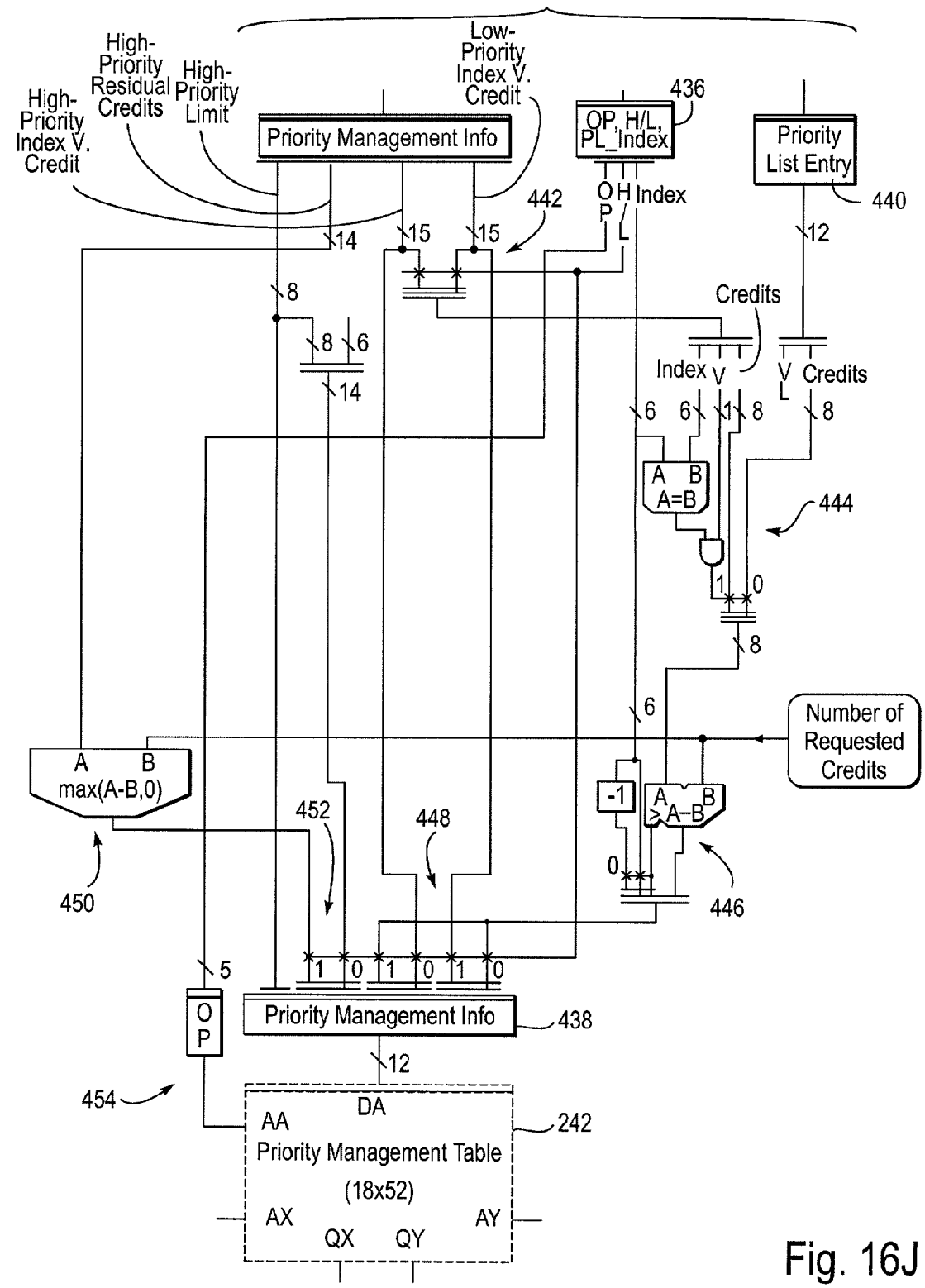
FIG. 16J is a pipeline diagram illustrating an exemplary embodiment of and update operation of the priority management table.

At block 374 of FIG. 15, an update operation of the priority management table 242 is performed. FIG. 16J is a pipeline diagram illustrating an exemplary embodiment of such an update operation of the priority management table 242. Specifically, high/low-priority index and residual credit information is extracted from the priority management information 438 as indicated at 442. At 444, the previous priority list index from the priority management table 242 and the new priority list index from the pending output port request thread are compared. If the old and new list indices are the same, and the residual credits from the priority management table 242 are valid (as indicated by a V-bit) then the residual credits value as indicated in the priority management information 438 is utilized. Otherwise, the priority credits value from the current priority list entry 440 is utilized.

As indicated at 446 in FIG. 16J, a number of requested credits is subtracted from a number of available priority credits. If the difference is greater than 0, then some of the residual priority credits and the priority list index stay the same, and the residual credits value is marked as valid. If there are no residual credits (i.e., the difference is 0 or negative), the valid bit is cleared and the priority list index is incremented by one modulo the number of entries in the high/low priority list 246/248.

As indicated at 448, the high/low-priority list index and residual credit fields in the priority management information 438 for the output port of the current request are updated.

As indicated at 450 in FIG. 16J, the number of requested credits is subtracted from the number of high priority residual credits and, if the difference is negative, the result is set to 0.

As indicated at 452, the high-priority residual credits field in the priority management information 438 for the output of the current request is updated. If the current request is high priority, the calculated value is utilized for this update. If the current request is low-priority, the high-priority residual credits is set to the limits of high-priority 14.

As indicated at 454, if the pending OP-VL request is allocated its needed control credits and its target output port, then the updated priority information is written to the priority management table 242.

Figure 17:
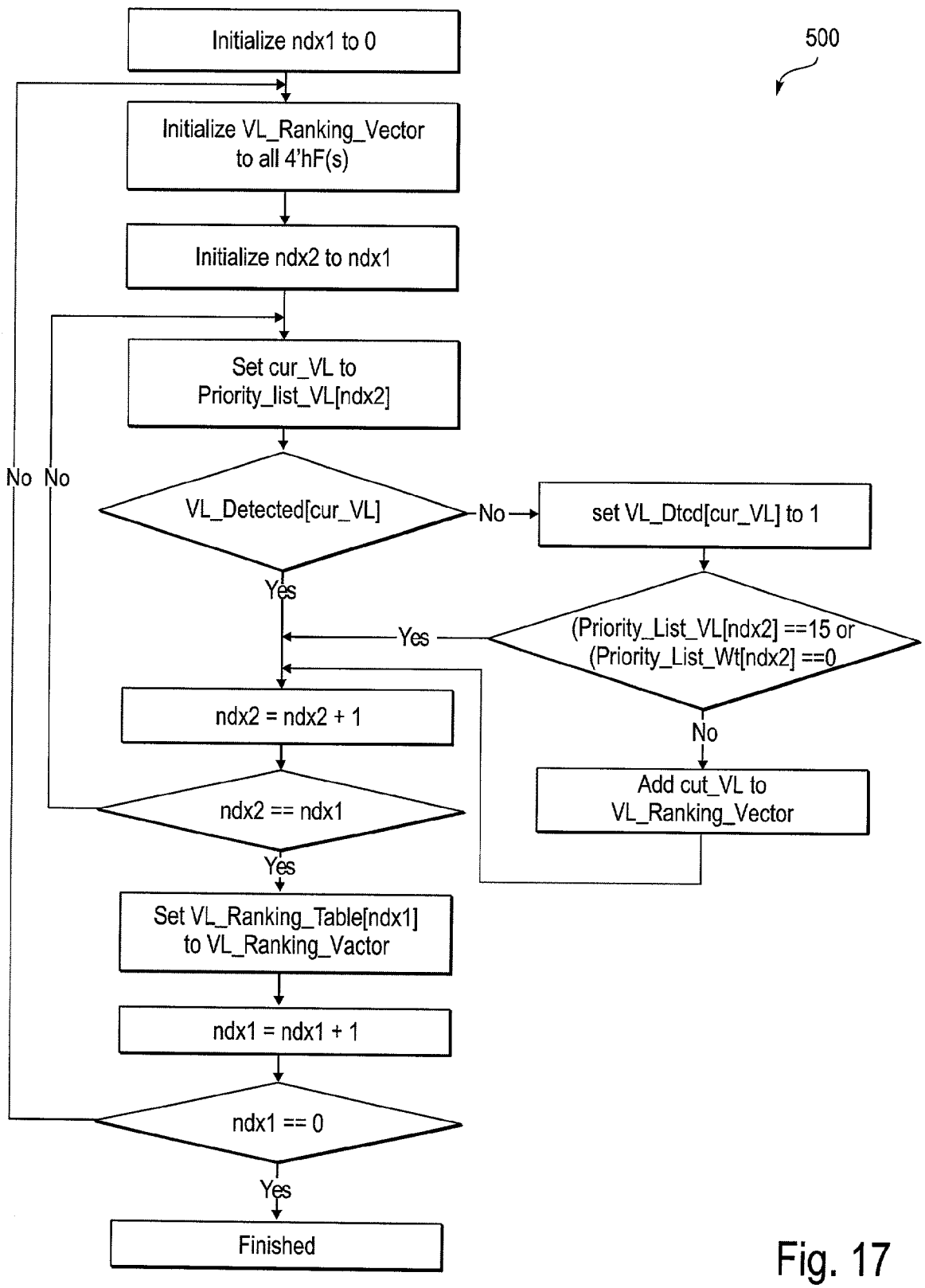
FIG. 17 is a flow chart illustrating a method, according to an exemplary embodiment of the present invention, to generate a virtual lane ranking table.

FIG. 17 is a flow chart illustrating a method 500, according to an exemplary embodiment of the present invention, to generate a virtual lane ranking table 250 or 252. The method 500 is repeated for all ports 24 of a datapath 20, and for all high and low priority tables within each port. Note that the incrementation of the NDX1 and NDX2 variables can overflow and wrap back to 0. The overflow bit is ignored.

Figure 18:
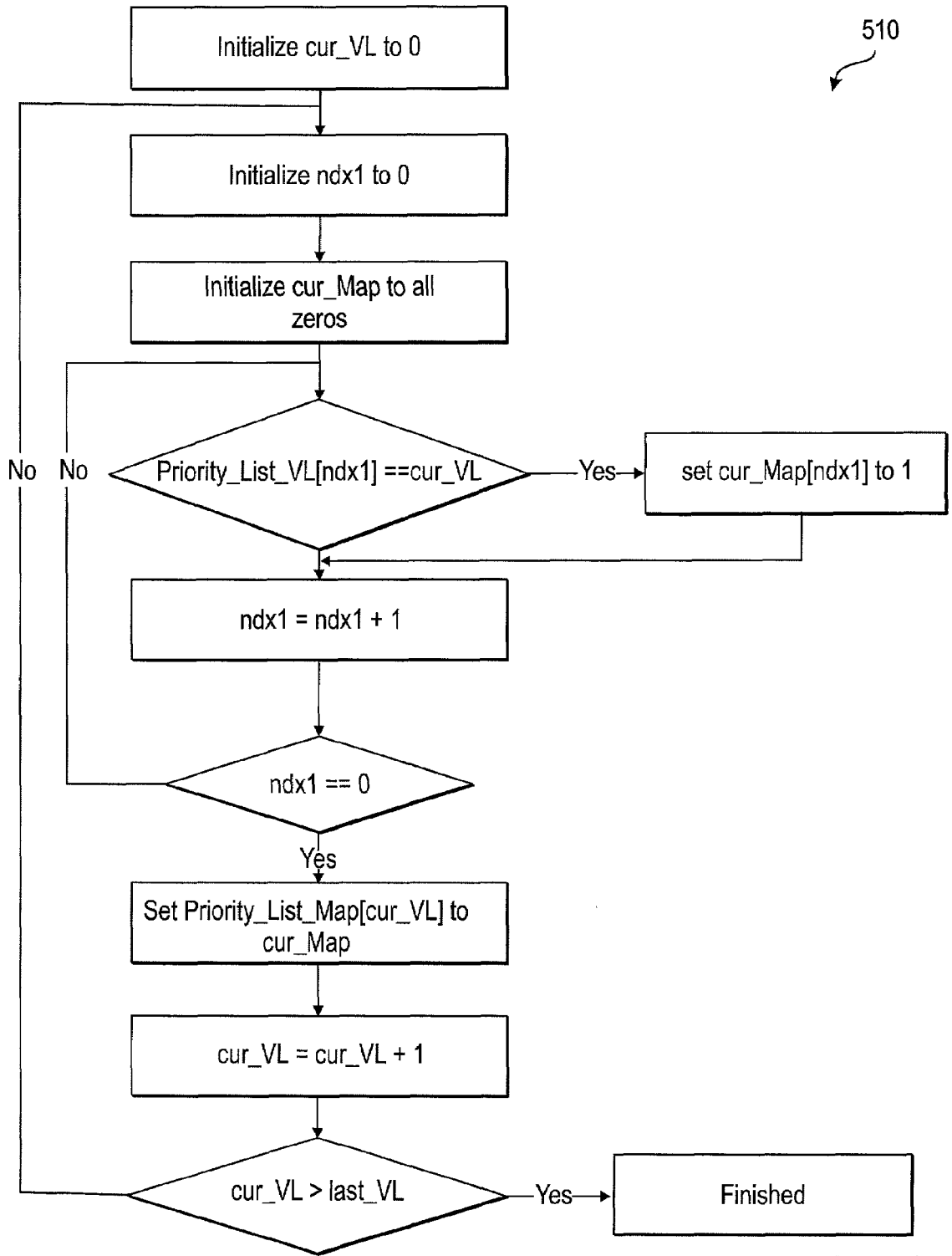
FIG. 18 is a flow chart illustrating a method, according to an exemplary embodiment of the present invention, to generate a priority list map.

FIG. 18 is a flow chart illustrating a method 510, according to an exemplary embodiment of the present invention, to generate a priority list map 254. Again, the method 510 is repeated for all ports 24 of a datapath 20. Again note that the incrementation can overflow and wrap back to 0 as the overflow bit is ignored.

Note also that embodiments of the present description may be implemented not only within a physical circuit (e.g., on semiconductor chip) but also within machine-readable media. For example, the circuits and designs discussed above may be stored upon and/or embedded within machine-readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine-readable storage medium. A machine-readable storage medium includes any mechanism/instructions for storing information in a form readable by a machine (e.g., a computer). For example, a machine-readable storage medium includes read only memory (ROM); random access memory (RAM); magnetic disk storage media; optical storage media; and flash memory devices. A transmission medium, for example, includes optical, acoustical or other form of propagated signals (e.g., carrier waves, infrared signals, digital signals, etc.); etc.

Thus, a method and system to allocate resources within an interconnect device according to a resource allocation table have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method performed in an interconnect device to allocate resource capacity, the method including:

generating a resource allocation table including a plurality of allocation entries indicating an allocation of the resource capacity to a plurality of resource consumers comprising a plurality of data streams supported by the interconnect device, wherein the resource capacity comprises bandwidth on a physical link shared by the plurality of data streams supported by the interconnect device;

retrieving a ranking vector corresponding to a first allocation entry within the allocation table;

generating a pending request vector indicating for which of the plurality of resource consumers a resource request is pending; and selecting a selected resource consumer to consume at least a portion of the resource capacity, the selection being performed combinatorially utilizing the ranking vector and the pending request vector, wherein the ranking vector is derived from the resource allocation table and comprises a list of resource consumers of the plurality of resource consumers, the list being ordered in accordance with an order of appearance of a first allocation entry for a respective resource consumer within the resource allocation table.

2. The method of claim 1 wherein the order of appearance is determined in a first direction within the resource allocation table from the first allocation entry.

3. The method of claim 1 wherein the ranking vector is retrieved from a ranking table, the ranking table comprising a plurality of ranking vectors, each of which corresponds to an entry within the resource allocation table.

4. The method of claim 3 wherein the retrieval of the ranking vector includes utilizing a resource allocation table index pointer, identifying the first allocation entry within the resource allocation table, to retrieve the ranking vector from the ranking table.

5. The method of claim 1 wherein a second allocation entry within the resource allocation table records the allocation of none of the resource capacity to a second resource consumer, and wherein the second allocation entry is excluded from consideration as a first entry for the second resource consumer within the resource allocation table.

6. The method of claim 1 wherein the resource allocation table includes multiple allocation entries for a first resource consumer of the plurality of resource consumers.

7. The method of claim 1 wherein the selection of the selected resource consumer is performed utilizing combinational logic that selects a highest order resource consumer, within the ranking vector and for which a request is pending, as the selected resource consumer.

8. The method of claim 7 wherein the selection of the selected resource consumer performed utilizing the combinational logic is performed in one clock cycle.

9. The method of claim 1 wherein the generation of the pending request vector includes examining a respective request queue associated with each of the plurality of resource consumers to determine whether the respective request queue includes a resource request associated with the respective resource consumer.

10. The method of claim 1 including, subsequent to the selection of the selected resource consumer, updating a resource allocation table index pointer to point to a second allocation entry within the resource allocation table.

11. The method of claim 10 wherein the second allocation entry corresponds to the selected resource consumer if the resource capacity allocated to the selected resource consumer is not consumed by at least one resource request associated with the selected resource consumer.

12. The method of claim 11 wherein the second allocation entry corresponds to a further resource consumer, downstream of the selected resource consumer within the resource allocation table, if the resource capacity allocated to the selected resource consumer is consumed by at least one resource request associated with the selected resource consumer.

13. The method of claim 10 wherein the updating of the resource allocation table index pointer includes retrieving a first resource allocation table bit vector associated with the selected resource consumer, the first resource allocation table bit vector including a bit entry corresponding to each allocation entry within the resource allocation table, at least one of the bit entries being set to flag at least one allocation entry for the selected resource consumer within the resource allocation table.

14. A system in an interconnect device, the system configured to allocate resource capacity within the interconnect device, the system including:
   a memory to store a resource allocation table and a ranking table, and to output a ranking vector, from the ranking table, corresponding to a first allocation entry within the allocation table, the resource allocation table including a plurality of allocation entries indicating an allocation of the resource capacity to a plurality of the resource consumers comprising a plurality of data streams supported by the interconnect device, wherein the resource capacity comprises bandwidth on a physical link shared by the plurality of data streams supported by the interconnect device;
   a resource allocator to generate a pending request vector indicating for which of the plurality of resource consumers a resource request is pending; and
   a selector having combinational logic to select a selected resource consumer to consume at least a portion of the resource capacity, the selection being performed by the selector combinatorially utilizing the ranking vector and the pending request vector,
   wherein the ranking vector is derived from the resource allocation table and comprises a list of resource consumers of the plurality of resource consumers, the list being ordered in accordance with an order of appearance of a first allocation entry for a respective resource consumer within the resource allocation table.

15. The system of claim 14 wherein the order of appearance is determined in a first direction within the resource allocation table from the first allocation entry.

16. The system of claim 14 wherein the ranking table comprises a plurality of ranking vectors, each of which corresponds to an entry within the resource allocation table.

17. The system of claim 16 wherein the memory maintains a resource allocation table index pointer, and wherein the ranking vector is outputted from the memory utilizing the resource allocation table index pointer, the resource allocation table index pointer identifying the first allocation entry within the resource allocation table.

18. The system of claim 14 wherein a second allocation entry within the resource allocation table records the allocation of none of the resource capacity to a second resource consumer, and wherein the second allocation entry is excluded from consideration as a first entry for the second resource consumer within the resource allocation table.

19. The system of claim 14 wherein the resource allocation table includes multiple allocation entries for a first resource consumer of the plurality of resource consumers.

20. The system of claim 14 wherein the combinational logic enables the selector to select a highest order resource consumer, within the ranking vector and for which a request is pending, as the selected resource consumer.

21. The system of claim 20 wherein the selector operates to select the selected resource consumer within one clock cycle.

22. The system of claim 14 wherein the resource allocator is to examine a respective request queue associated with each of the plurality of resource consumers to determine whether the respective request queue includes a resource request associated with the respective resource consumer.

23. The system of claim 14 including a further selector, subsequent to the selection of the selected resource consumer, to update a resource allocation table index pointer to point to a second allocation entry within the resource allocation table.

24. The system of claim 23 wherein the second allocation entry corresponds to the selected resource consumer if the resource capacity allocated to the selected resource consumer is not consumed by at least one resource request associated with the selected resource consumer.

25. The system of claim 24 wherein the second allocation entry corresponds to a further resource consumer, downstream of the selected resource consumer within the resource allocation table, if the resource capacity allocated to the selected resource consumer is consumed by at least one resource request associated with the selected resource consumer.

26. The system of claim 23 wherein the updating of the resource allocation table index pointer by the further selector includes retrieving a first resource allocation table bit vector associated with the selected resource consumer, the first resource allocation table bit vector including a bit entry corresponding to each allocation entry within the resource allocation table, at least one of the bit entries being set to flag at least one allocation entry for the selected resource consumer within the resource allocation table.

27. A machine-readable storage medium storing instructions executed by a computer, said machine readable storage medium comprising:
   instructions for allowing a memory to store a resource allocation table and a ranking table, and to output a ranking vector, from the ranking table, corresponding to a first allocation entry within the allocation table, the resource allocation table including a plurality of allocation entries indicating an allocation of the resource capacity to a plurality of the resource consumers comprising a plurality of data streams wherein the resource capacity comprises bandwidth on a physical link shared by the plurality of data streams;
   instructions for allowing a resource allocator to generate a pending request vector indicating for which of the plurality of resource consumers a resource request is pending; and
   instructions for allowing a selector having combinational logic to select a selected resource consumer to consume at least a portion of the resource capacity, the selection being performed by the selector combinatorially utilizing the ranking vector and the pending request vector,
   wherein the ranking vector is derived from the resource allocation table and comprises a list of resource consumers of the plurality of resource consumers, the list being ordered in accordance with an order of appearance of a first allocation entry for a respective resource consumer within the resource allocation table.

28. The machine-readable storage medium of claim 27 wherein the description comprises a behavioral level description of the circuit.

29. The machine-readable storage medium of claim 28 wherein the behavioral level description is compatible with a Very high speed integrated circuit Hardware Description Language (VHDL) format.

30. The machine-readable storage medium of claim 28 wherein the behavioral level description is compatible with a Verilog format.

31. A system in an interconnect device, the system configured to allocate resource capacity within the interconnect device in accordance with a resource allocation table, the resource allocation table including a plurality of allocation entries indicating an allocation of the resource capacity to a plurality of resource consumers comprising a plurality of data streams supported by the interconnect device, wherein the resource capacity comprises bandwidth on a physical link shared by a plurality of data streams supported by the interconnect device, the system comprising:

first means for storing the resource allocation table and a ranking table, and for outputting a ranking vector, from the ranking table, corresponding to a first allocation entry within the allocation table;

second means for generating a pending request vector indicating for which of the plurality of resource consumers a resource request is pending; and third means having combinational logic for selecting a selected resource consumer to consume at least a portion of the resource capacity, the selection being performed by the third means combinatorially utilizing the ranking vector and the pending request vector, wherein the ranking vector is derived from the resource allocation table and comprises a list of resource consumers of the plurality of resource consumers, the list being ordered in accordance with an order of appearance of a first allocation entry for a respective resource consumer within the resource allocation table.

* * * * *